US010034314B2

(12) United States Patent
White et al.

(10) Patent No.: US 10,034,314 B2
(45) Date of Patent: *Jul. 24, 2018

(54) LIGHTING SYSTEM WITH CELLULAR NETWORKING

(71) Applicant: ABL IP HOLDING LLC, Conyers, GA (US)

(72) Inventors: Sean P. White, Reston, VA (US); Jack C. Rains, Jr., Herndon, VA (US); David P. Ramer, Reston, VA (US); Januk Aggarwal, Tysons Corner, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/245,465

(22) Filed: Aug. 24, 2016

(65) Prior Publication Data
US 2016/0366710 A1 Dec. 15, 2016

Related U.S. Application Data

(63) Continuation of application No. 14/701,762, filed on May 1, 2015, now Pat. No. 9,468,078.

(51) Int. Cl.
*H04W 76/10* (2018.01)
*H04W 16/24* (2009.01)
(Continued)

(52) U.S. Cl.
CPC ....... *H04W 76/02* (2013.01); *H04M 1/72533* (2013.01); *H04W 16/24* (2013.01);
(Continued)

(58) Field of Classification Search
CPC ..... H04W 76/02; H04W 48/16; H04W 16/24; H04W 84/18; H04W 84/14;
(Continued)

(56) References Cited

U.S. PATENT DOCUMENTS 5,978,364 A 11/1999 Melnik
6,548,967 B1 4/2003 Dowling et al.
(Continued)

OTHER PUBLICATIONS

LTE Direct, "What is LTE Direct?", https://ltedirect.qualcomm.com, copyright 2014 and printed Mar. 26, 2015.
(Continued)

*Primary Examiner* — Brandon J Miller
(74) *Attorney, Agent, or Firm* — RatnerPrestia

(57) ABSTRACT

Disclosed are examples of lighting devices and other devices that are equipped with a cellular transceiver that is configured to communicate using licensed cellular radio frequency spectrum in both a small-scale cellular network and a large-scale cellular communication network. By utilizing a short-range, low-power cellular transceiver setting, a lighting device facilitates communication, within the space in which the lighting device is installed, of messages between the lighting device and other types of user devices. Such an equipped lighting device may be configured to participate in the generation and delivery of different types of messages, such as data, emergency broadcast information, news and other information as well extend the reach of devices within the space in which the equipped lighting devices are located.

22 Claims, 11 Drawing Sheets

(51) Int. Cl.
*H04W 48/16* (2009.01)
*H04M 1/725* (2006.01)
*H05B 37/02* (2006.01)
*H04W 84/04* (2009.01)
*H04W 84/14* (2009.01)
*H04W 84/18* (2009.01)
*H04W 76/02* (2009.01)

(52) U.S. Cl.
CPC ........... *H04W 48/16* (2013.01); *H04W 76/10* (2018.02); *H05B 37/0272* (2013.01); *H04W 84/042* (2013.01); *H04W 84/14* (2013.01); *H04W 84/18* (2013.01); *Y02D 70/00* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/22* (2018.01)

(58) Field of Classification Search
CPC ............ H04W 84/042; H05B 37/0272; H04M 1/72533; Y02B 60/50
See application file for complete search history.

(56) References Cited

U.S. PATENT DOCUMENTS

| | | | |
|---|---|---|---|
| 8,121,089 | B2 | 2/2012 | Bao et al. |
| 8,494,522 | B2 | 7/2013 | Chen et al. |
| 8,538,407 | B2 | 9/2013 | Addy |
| 9,386,662 | B1 | 7/2016 | Hoddie et al. |
| 9,398,669 | B2 | 7/2016 | Aggarwal et al. |
| 9,468,078 | B1* | 10/2016 | White .................. H05B 37/0272 |
| 2007/0157258 | A1* | 7/2007 | Jung ................ H04N 21/43615 725/80 |
| 2010/0189011 | A1 | 7/2010 | Jing et al. |
| 2011/0135317 | A1* | 6/2011 | Chaplin .............. H04B 10/1149 398/172 |
| 2013/0182693 | A1* | 7/2013 | Sperling ........... H04W 52/0229 370/338 |
| 2013/0272262 | A1 | 10/2013 | Li et al. |
| 2015/0126200 | A1 | 5/2015 | Wang et al. |
| 2016/0035011 | A1* | 2/2016 | Tuo ......................... H04W 4/04 705/14.64 |
| 2017/0251365 | A1* | 8/2017 | Burchardt ............. H04W 12/06 |

OTHER PUBLICATIONS

Ericsson White Paper, "LTE Broadcast a Revenue Enabler in the Mobile Media Era", 284 23-3192 UEN, Feb. 2013.
Wireless ad hoc network, http://en.wikipedia.org/wiki/wireless_ad_hoc_network, printed Mar. 26, 2015.
Wireless mesh network, http://en.wikipedia.org/wiki/wireless_mesh_network, printed Mar. 26, 2015.
What is the difference between Ad-Hoc and Mesh Network?, http://superuser.com/questions/481145/what-is-the-difference-between-ad-hoc-and-mesh-network, printed Mar. 26, 2015.
Qualcomm Technologies. Inc., "LTE Direct Always-on Device-to-Device Proximal Discovery"; Aug. 2014, downloaded from https://www.qualcomm.com/media/documents/files/lte-direct-always-on-device-to-device-proximal-discovery.pdf on or about Mar. 26, 2015.
LTE DIRECT Whitepaper created Aug. 16, 2013, printed Jun. 8, 2015.
Qualcomm Research San Diego, "LTE Direct Overview" Sajith Balraj Qualcomm Research, 2012, https://www.qualcomm.com/.../ctia-2013-lte-advanced-lte.
Prakash Sangam, Qualcomm, "What is Next for LTE," CITA May 22, 2013, printed Jun. 12, 2015.
Seshadri Mohan et al., "Social Networks Meet Mobile Networks", IEEE Communications Magazine, Jun. 2012, http://s3.amazonaws.com/sdieee/205-LTE+Direct+IEEE+VTC+San+Diego.pdf.
Rafe Needleman, "Unbreakable: Mesh Networks are in your smartphone's future," Jul. 13, 2012, http://www.cnet.com/news/unbreakable-mesh-networks-are-in-your-smartphones-future, printed Jun. 8, 2015.
Tim Bajarin, "How Qualcomm Is Advancing Wireless Innovation," Oct. 20, 2014, pcmag.com, printed Jun. 8, 2015.

* cited by examiner

400

500

LIGHTING SYSTEM WITH CELLULAR NETWORKING

CROSS-REFERENCE TO RELATED APPLICATION

This application is a continuation of U.S. patent application Ser. No. 14/701,762 entitled "Lighting System with Cellular Networking," filed on May 1, 2015, all of which is incorporated by reference herein in its entirety.

TECHNICAL FIELD

The subject matter of the disclosed examples relates to lighting devices with cellular transceivers configured to communicate with other lighting devices via a private cellular network and with a public cellular communication network.

BACKGROUND

Electrical lighting has become commonplace in modern society. Electrical lighting devices are commonly deployed, for example, in homes, buildings or commercial and other enterprise establishments, as well as in various outdoor settings. Even in a relatively small state or country, there may be millions of lighting devices in use.

With the advent of modern electronics has come advancement, including advances in the networking and control capabilities of the lighting devices. By nature, solid state light sources such as light emitting diodes (LEDs) are easily controlled by electronic logic circuits or processors. As increased processing capacity finds its way into the lighting devices for purposes of lighting control, the incorporation of associated communications capabilities, e.g. to allow lighting devices to communicate with system control elements and/or with each other via different communication protocols such as Zigbee, X10, Wi-Fi, Bluetooth or the like, is becoming more commonplace. In this way, advanced electronics in the lighting devices as well as the associated control elements have facilitated more sophisticated lighting control algorithms as well as increased networking of lighting devices and/or other devices within the space in which the lighting devices are installed. In addition, lighting devices typically having nearly uninterrupted access to electrical power are ubiquitous; with a lighting device installed in almost every facility.

The advent of the advanced electronics, nearly uninterrupted supply of power, and ubiquitous nature of lighting device deployments makes the lighting device an excellent candidate for incorporation into a network of devices to provide services, such as data communication, location-relevant data, emergency alerts, and the like. When used in the context of a network device or in a network, lighting devices are used primarily as a component of a premises broadband local area network. Some examples include wireless networking such as Wi-Fi or perhaps a Bluetooth-like network. While lighting devices have been developed to include cellular communication capabilities, these cellular communication capabilities installed in lighting devices have primarily been used as repeaters for a cellular communication network in order to extend the coverage of the cellular carrier.

Cellular communication network systems are known for providing cellular coverage over large geographical areas. These large-scale cellular communication network systems provided by cellular carriers include components that facilitate calls from one city, such as New York City, to be completed to another city, such as San Francisco, a great distance away from the originating device. This connectivity is accomplished by use of cellular coverage areas, which are serviced by cellular communication network access points, nodes or base stations operating in a portion of the cellular radio frequency spectrum that cover a geographical area. The cellular communication network system includes components that in response to connection requests from user devices, exchange/forward access request messages, and authorization and authentication messages to establish a cellular communication network connection over the air with the requesting user device. This exchange of messages consumes network resources and bandwidth, and also consumes battery power of the respective user devices. The network components also locate the intended recipient device identified in the connection request, and if authorized set-up communications between the devices.

Similar use of network resources, bandwidth and consumption of user device battery power occurs when a user device accesses a data source, such as a website, music service, video service or the like via the public data network (Internet), or a large-scale cellular communication network.

In the past, user devices were primarily used for making and receiving voice calls, sending and receiving text messages, exchanging data (e.g., sending e-mail), and providing and receiving location information. However, as user devices become more application centric, the user devices, while still performing those primary tasks, are becoming more involved in providing information related to the user's social interactions, business relationships, and daily customs, such as commuting, coffee breaks, shopping and the like, based on applications used by the user device.

For example, solutions have been proposed that allow a user device to receive location relevant information via the large-scale cellular communication network or an available Wi-Fi network in the vicinity of the user device. For example, growth in long term evolution (LTE) technologies, such as LTE Direct or LTE Advanced provided in cellular chipsets manufactured by Qualcomm®, allow devices to exchange messages using cellular radio frequency spectrum. The LTE Direct or LTE Advanced chipsets provide a means for devices to communicate very brief messages in a peer-to-peer fashion without having to gain access to the large-scale cellular communication network via a cellular network provider cellular network access point, such as an eNode-B, a base station or the like. However, these LTE Direct chipsets provide only a brief period of time in which the user device broadcasts short messages and/or receives short messages from similar user devices with the LTE Direct chipset by the large-scale cellular communication network servicing the user device. While LTE Direct may be useful for peer discovery, it does not appear to provide the capability to satisfy peer-to-peer connectivity or to allow the equipped-devices to serve as data sources to user devices.

What is needed is a means for leveraging the advances in both lighting and cellular technology to improve the inter-networking of lighting devices and other devices through the utilization of the cellular radio frequency spectrum that improves the lighting device to allow the lighting device to be a more integral participant in the communication infrastructure of a facility, and a participant, instead of a pass through, in the cellular communication infrastructure as a whole.

BRIEF DESCRIPTION OF THE DRAWINGS

The drawing figures depict one or more implementations in accord with the present concepts, by way of example only, not by way of limitations. In the Figures, like reference numerals refer to the same or similar elements.

DETAILED DESCRIPTION

Figure 1:
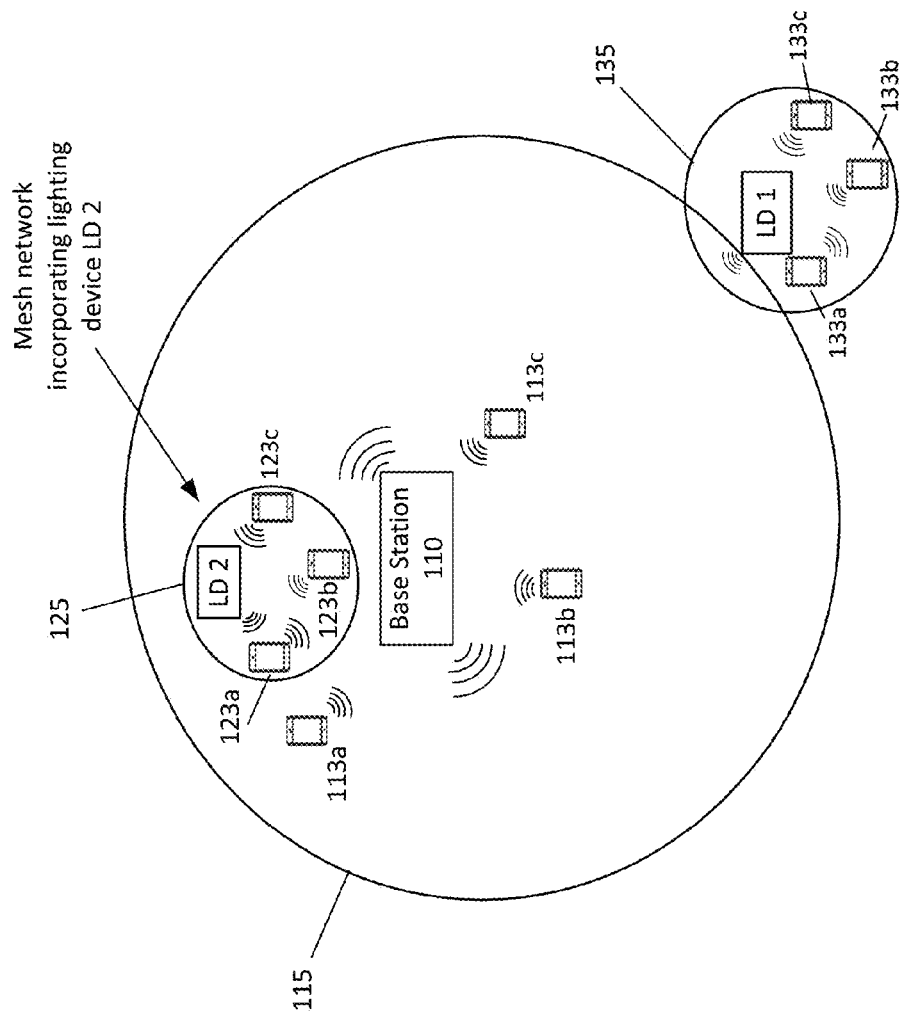
FIG. 1 illustrates an example of an environment that implements small-scale wireless networking, e.g., in a lighting system, using cellular resources in an area also served by a large-scale cellular network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The following examples describe lighting devices configured with a cellular transceiver that improves the internetworking of lighting devices and other devices through the utilization of the cellular radio frequency spectrum in such a way that the lighting device improves the communication infrastructure of a facility, or premises where the lighting device is installed.

Recently, there have been proposals to allow mobile devices to wirelessly connect to each other in a mesh network, such that if one device has a suitable connection to a public cellular communication tower, but a second device does not, the second device can "piggyback on," use, the first device's connection. The technology has been shown to be effective so long as the mobile devices are "reasonably" close to each other. Problems arise, however, if the mobile device user seeking a mesh network connection is in an area with few, if any, of other users' mobile devices within range (e.g. in a building after normal work hours) of the mobile device seeking a mesh network connection. To mitigate the effects of a few users in an area that have a usable connection, it is proposed to equip lighting devices with components that facilitate use of lighting devices to perform the "piggyback" function using a small-scale wireless network. The following examples contemplate devices in a lighting system having cellular radios, where the cellular radios may act as participants in small-scale network. This may be an appropriate time to discuss the small-scale network and the different types of communications that may utilize the wireless capabilities of the small-scale network. Examples of the different types of communications include mesh networking communications, ad hoc communications and peer-to-peer. There are fundamental differences between these types of communications.

In a mesh network implementation, if one of the lighting devices has cellular connectivity to a cell tower, e.g., an eNodeB or base station, the cellular mesh network may allow mobile devices in a building that otherwise may have poor connectivity to "piggyback" through the mesh network of the small-scale network onto the public cellular communication network connection to the cell tower. Each device participating in a mesh network acts as a routing device that assists other devices in the mesh network by forwarding data packets for these other devices to intended recipients. The mesh network provides a multi-"hops" capability. In contrast, an ad hoc network is a network in which devices in the network communicate directly to any other device within wireless radio range without using a central access point router. In essence, the ad hoc network bypasses a router. However, devices participating in an ad hoc network arrangement do not have the capability to perform the multi-hopping useful in the mesh network.

Peer-to-peer simply means that application layer clients directly talk to each other without a central server infrastructure, ad hoc and mesh networking can all support peer-to-peer communications as they are instances of device-to-device communication, but at different layers of the OSI model. In the OSI model, the ad hoc networking is at the OSI 1 layer, the physical layer, whereas mesh networking is at the OSI 3 layer, network layer, that is responsible for data routing. The peer-to-peer clients are at the application layer.

User devices equipped with the appropriately-configured LTE cellular transceivers are able to communicate with other similarly configured devices, such as a lighting device, via the cellular radio frequency spectrum without having to interact with the large-scale cellular communication network. There is the potential for lighting device and/or user devices equipped with the cellular transceivers to interfere with the large-scale cellular communication network. In order to mitigate potential interference with the cellular radio frequency spectrum being used by the large-scale cellular communication network in the vicinity of the devices equipped with the cellular transceiver, the range of an appropriated-configured cellular transceiver may be limited to approximately 500 meters, similar to the LTE Direct chipset.

Some transceivers in lighting devices may operate at power levels for large-scale network communications, e.g., when linking to the larger network outside the premises, and operate at power levels for small-scale networking within the premises. The power may be set and maintained for some of the lighting devices' transceivers, e.g., for small-scale networking only within the premises. Mobile user device transceivers could be similarly limited, but the limitation is maintained only so long as a user device is in the vicinity of the small scale network implemented by the lighting devices.

For example, the appropriately-configured cellular transceiver utilizes minimal signal strength to transmit a signal approximately 500 meters. As a result, the cellular transceiver may not generate a signal that capable of obtaining access to the large-scale cellular communication network.

Examples of a cellular transceiver for lighting devices are not limited to only communicating within the small-scale, short-range cellular network, but are able to connect with the large-scale cellular communication network when requested and with the proper registrations and/or permissions to gain access to the large-scale cellular communication network.

Besides the above differences between the large-scale cellular communication network and the small-scale, short-range cellular network, another difference may be the category of end user device that is being served by the cellular mesh network and the large-scale cellular communication network, respectively. For example, a calling party on a street corner in New York City normally uses the large-scale cellular communication network to call a user device in San Francisco. In this type of use case, the large-scale cellular communication network is essentially open to the public at large. In other words, the large-scale cellular communication network is available to any network-registered, user device in the public (i.e., the public-at-large) and is regulated as a public entity, while the small-scale, short-range cellular network may also be available to any user device in the public, that device has to be within a certain vicinity of another device that is participating in the small-scale, short-range cellular network. For example, only those devices within the 500 meter vicinity of an appropriately configured lighting device, which is operating as a member of the small-scale, short-range cellular network are able to communicate as a member of the small-scale, short-range cellular network with the lighting device.

However, another user device located in a shopping mall without access to the large-scale communication network uses the small-scale, short-range cellular network to communicate within the shopping mall. The shopping mall locations use of small-scale, short-range cellular network is private as compared to the point-to-point calling provided by the large-scale cellular communication network because the shopping mall may have diminished access to the large-scale cellular communication network while the user device on the New York City street corner has full access to the large-scale cellular communication network.

A public network is considered to be a cellular communication network, offered by a mobile network operator, or a cellular carrier that is available to any user device of a user in the general public, e.g., with an appropriate subscription to network service(s). Conversely, a private network may be a network that is only available to user devices that meet certain criteria, in particular, membership in a private network may be limited by the range of the individual members of the private network from one another. For example, a private network range limitation may not permit respective user devices that are beyond a short range, such as 500 meters, from one another to be part of the private network. Private network membership may also be limited by permissions, e.g., based on association of the user or device with a particular enterprise, such as an employee of an organization owning or served via the private network.

In our small-scale network example, the private network member devices use cellular radio frequencies to communicate among one another albeit via low-power, short-range transmissions. The number of members in the private network may grow as new devices come within the short-range, such as 500 meters, of a present member of the private network that enables the new device to join the private network. In some examples, the private network may be considered a cellular mesh network whose communications are based on a cellular radio frequency transmissions having a lower power and a shorter range than communications made by devices participating in the public network.

In some indoor locations, users are beyond the range of a cellular communication tower and, as a result, do not have cellular service from the large-scale cellular communication network or from a public network. A possible solution is to include a cellular transceiver within a lighting device installed in an indoor location in which the cellular transceiver is configured to establish a connection with the large-scale cellular communication network. The cellular transceiver when attempting to establish the connection with the large-scale cellular network transmits signals in the cellular radio frequency spectrum that are transmitted at have power level normally used in the large-scale cellular network. These normal power level transmissions are at a higher power level than those proposed for using in the private networks described above. As will be described in the following examples, the signal transmission power levels of the cellular transceiver in the described lighting devices are selectable by a processor in the lighting device, which permits the lighting device to select when to use the normal, higher, power level signal transmissions versus the lower-power signal transmissions suitable for communication with members of the small-scale cellular network. This solution provides at least two advantages: enabling the lighting device to communicate with other lighting devices and user devices in a small-scale cellular network, and providing user devices with an access point to a large-scale cellular network, when, for example, signal strength to the user device is diminished due to being located indoors.

The disclosed concepts improve over prior lighting systems, particularly those utilizing networked intelligent lighting devices and other network connected elements because utilizing the licensed cellular bandwidth permits establishment of a network beyond individual lighting devices. The examples discussed below may also enable lighting devices to participate in small-scale cellular networking implementations within a premises, i.e., in an interior or exterior space, as well as provide the capability to provide devices within the premises with access to a large scale cellular network. Reference now is made in detail to the examples illustrated in the accompanying drawings and discussed below.

FIG. 1 illustrates an example of a networking environment 100. In the networking environment 100 of FIG. 1, a base station 110 may provide cellular communication service (e.g., such as 3G, 4G or LTE service) to devices such as user devices 113a, 113b, and 113c, and to lighting device LD 2 that are located within a coverage area periphery 115 of the base station 110. User devices 113a-c, 123a-c and 133a-c may be smartphones, personal computers, laptop computers, tablet computers or the like. In this example, the base station 110 is part of a large scale cellular communication network system. For example, the large scale cellular communication network system may provide cellular communication services (e.g., such as LTE service) to user devices in the public.

In this example, lighting device LD 1 may be an outdoor device that is near the periphery of the coverage area (i.e. range) 115 of the base station 110 cellular signals, while the user devices 133*a-c* are outside the periphery of the base station 110 coverage area 115, and therefore cannot connect to the large scale cellular communication network. Similar to user devices 123*a-c*, user devices 133*a-c* may be able to obtain connectivity to the large scale cellular communication network through the lighting device LD 1. Meanwhile, lighting device LD 2 may be located indoors and may be able to communicate via cellular radio frequency spectrum with devices only within the coverage area periphery 125.

The indoor locations in which lighting device LD 2 may be located may include, for example, a shopping mall, warehouse, office building, stadium, arena parking garage or the like. A lighting device LD 2 may include, for example, a light source, a processor, and a cellular transceiver (which will be described in a following example). The light source may produce visible light for general illumination within a space in which a number of lighting devices are installed. The light source may be configured to respond to control signals from the processor. The cellular transceiver may facilitate a wireless cellular connection to the base station 110 of the large-scale cellular communication network as well as a wireless connection to the devices 123*a-c* within the indoor space for small-scale network communications. Further details of a lighting device, such as the lighting device LD 2, will be described in more detail with reference to FIGS. 3-5.

In the environment 100 of FIG. 1, the lighting device LD 2 is in range of the base station 110 when the cellular transceiver of the lighting device LD 2 transmits or receives at a typical cellular communication power setting, and, therefore is able to access the large-scale cellular communication network via the base station 110. The one or more of devices 123*a-c* may also be in range of the base station 110 and may obtain cellular communication service directly from the base station 110. Or, under some circumstances, the devices 123*a-c* may be unable to obtain from or transmit a cellular signal of sufficient strength to the base station 110. For example, the particular devices 123*a-c*, due to their location, for example, may not have a signal of acceptable signal strength from the base station 110. In this case, the devices 123*a-c* may look for an alternate source of connectivity to the large-scale cellular communication network. In which case, the cellular transceiver of the lighting device LD 2 may provide the capability for the devices 123*a-c* to connect to the large-scale cellular communication network by operating the cellular transceiver at normal power for the link to the large-scale network and operating the user devices and/or a lighting device transceiver at a lower power for the small-scale network link(s).

By incorporating a cellular transceiver and additional functionality into lighting device LD 2, the lighting device LD 2 is able to participate in private cellular network that includes devices 123*a-c*. The private cellular network is decoupled from the large-scale cellular communication network, which means as explained above that the lighting device LD 2 does not need permission or have to access control components (not shown) of the large-scale cellular communication network to establish small-scale network communications. The respective devices 123*a-c*, which also may have additional functionality similar to that of the lighting device, may be able to communicate on the same cellular radio frequency spectrum as the lighting device LD 2. As a result, the devices 123*a-c* and the lighting device LD 2 may communicate with one another directly in a peer-to-peer communication system or communication may be facilitated through lighting device LD 2. The private cellular network as explained above facilitates cellular communication without the need for the devices participating in the small-scale network to connect to the large-scale cellular communication network. For example, the lighting device LD 2 may be configured to generate mass broadcasts in emergency situations or for event broadcasts, such as an announcement of commencement of a speech in a particular area of a convention center or tradeshow. In another example, one or more devices 123*a-c* may choose to obtain mobile communication service via the lighting device LD 2 instead of from the base station 110 because the user of a particular device 123*a-c* desires to save on cellular minutes or save power, for example.

In addition, this example of lighting device LD 2 is suitable to address saturation caused by an overwhelming number of mobile user devices at a particular area, such as sports arena, attempting to gain access to a particular cellular base station of the public cellular network. For example, when thousands of devices in the sports arena attempt to nearly simultaneously obtain cellular service from the base station 110, the base station 110 becomes overwhelmed (i.e., saturated) and is unable to keep up with demand. To alleviate some of the connection burden on the base station 110, a small-scale cellular network may be established, for example, incorporating the devices within the coverage area 125 of lighting device LD 2. For example, the lighting device LD 2 may be installed in a location (e.g., near a specific seating section or concourse) of the sports arena, so devices within the coverage area 125 of lighting device LD 2 may attempt to connect to the lighting device LD 2 instead of directly with the base station 110. The devices, such as devices 123*a-c*, may attempt to connect to the lighting device LD 2 instead of the base station 110 because, for example, the signal strength of the cellular signal from the lighting device LD 2 will be stronger than the signal from the base station 110. Such a cellular mesh network may include lighting device LD 2 and devices 123*a-c*. Other lighting devices in the sports arena may similarly be used to form a cellular mesh network within a short range coverage area of the respective lighting devices. Note that as a user device travels about the sports arena, for example, from one concourse to the next, the user device may leave membership of one cellular mesh network and become a member of a different cellular mesh network.

As the mesh network is created, one of the members of the mesh network, most likely, the lighting device, is promoted to a LEADER device according to known mesh networking techniques, and facilitates control of the mesh network. For example, the mesh networking technique for choosing the LEADER device is based on public cellular communication network signal strength and lighting devices in the sports arena, such as lighting device LD 2, for example, has connections to public cellular communication network antennas positioned on the sports arena, this connection to public cellular communication network antennas allow the lighting devices to have the strongest signal strength among devices in the cellular mesh network. As a result, the respective lighting device is chosen as the LEADER. According to the networking protocol being used the LEADER device performs the functions needed to facilitate a cellular connection to the base station 110, for the user devices within range. For example, the lighting device LD 2 processor is configured to perform a routing function that enables one or more user devices to be provided with access to the large-scale cellular network. Since lighting device LD 2 is the LEADER device in this example, it facilitates provision of public cellular communication service to devices 123*a-c* within coverage area 125. This example may mitigate the saturation problem by consolidating the number of devices attempting to access the large-scale cellular communication network via the base station 110.

Continuing with the illustrated example of FIG. 1, devices 133*a-c* may be out of range (i.e., due to insufficient signal strength) of the base station 110. However, lighting device LD 1, which is configured similar to lighting device LD 2, may function as a cellular repeater having a sufficient signal to connect to the base station 110, which allows devices 133*a-c* that are out of range due to insufficient signal to communicate with LTE base station 110.

As for devices 113*a-c*, these devices may be able to connect to base station 110 without having direct access to base station 110 because of a mesh networking technique implemented by the devices 113*a-c*, to use lighting device LD 2 as an access point for connecting to the base station 110. For example, assume lighting device is positioned close to a window of the indoor area in which it is installed However, there may be scenarios in which one of the user devices, such as device 113*a*, is experiencing degraded signal strength from the base station 110 (e.g., due to being in an urban canyon or the like). The processor of device 113*a* is configured to look for other devices that indicate the strength of their public cellular communication signal strength. Based on this indication, the device 113*a* processor identifies lighting device LD 2 as being accessible for public cellular communication services. Assuming device 113*a* is within a relatively short range of lighting device LD 2 (e.g., across the street from), the device 113*a* may attempt to connect to lighting device LD 2 as part of the mesh network or the private cellular network to obtain a connection to base station 110. Alternatively, the device 113*a* may attempt to connect to device 123*a* as part of the small-scale cellular network, to obtain a connection to base station 110. In other examples, the respective devices 113*a-c* and 123*a-c* are configured to perform an automatic selection between connecting to the lighting device LD 1 or 2 or each other via cellular, Wi-Fi or Bluetooth based on signal strength.

An advantage of a lighting device configured as described above is that such a lighting device LD 1 or 2 provides range assistance and preserves battery power for user devices by allowing operation of the transceivers of the user device at lower power levels. In the sports arena example, the devices may not interfere as much with one another because the user devices 113*a-c* and 123*a-c* are connecting at lower power levels over a shorter range in the private cellular network or cellular mesh network with the lighting device LD 2 and therefore, user devices 113*a-c* and 123*a-c* do not need to generate powerful signals in an attempt to reach the base station 110 with a signal of sufficient strength.

Figure 2:
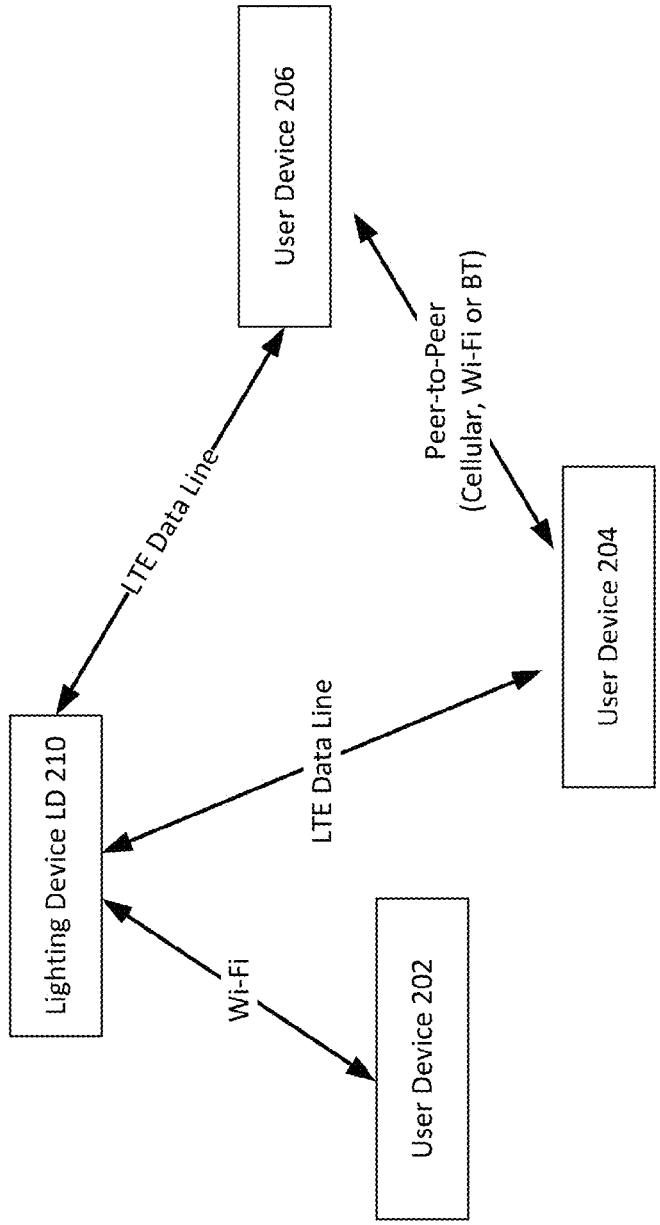
FIG. 2 is a block diagram of a simple example of a lighting device and other devices configured to communicate in a private network environment.

The interaction of user devices and a lighting device will be described in more detail with reference to FIG. 2, which is a block diagram of a simple example of an appropriately configured lighting device and other appropriately configured devices communicating in a small-scale cellular network environment.

The small-scale cellular network 200 environment that has a short range coverage area, such as coverage area 125 of FIG. 1, that is serviced by cellular transceivers within the respective lighting device LD 210 and user devices 202-206. User devices 202-206 may be smartphones, personal computers, laptop computers, tablet computers, cash registers, printers, vending machines, automatic teller machines, credit approval devices, or the like. The power and resulting range of signals transmitted from the cellular transceiver is purposely limited by the device processor to less than (<) 500 meters as discussed above with regard to the small-scale cellular network. For example, the lighting device LD 210 processor and user devices' 202-206 processors sets transmission power settings of the respective device's transceiver to transmit at a lower power setting than normal (i.e., the power setting for large scale cellular network communications) when attempting to communicate in the private cellular network. The lighting device LD 210 may be configured in a manner similar to lighting device LD 2 of FIG. 1.

The lighting device LD 210 and/or the user devices 202-206 may be configured with a broadband (e.g., Wi-Fi or Li-Fi) transceiver, a Bluetooth (BT) (or Bluetooth Low Energy (BLE)) transceiver and a cellular transceiver, the cellular transceiver may be configurable based on processor selections to communicate in the private cellular network or in the public (large-scale) cellular communication network. In an example, when user device 202 is attempting to connect to lighting device LD 210, a processor within user device 202 traverses through a hierarchy of connection options for connecting to a network. For example, the device 202 processor attempts to first connect via BT, and if unsatisfactory, defaults to trying to connect via Wi-Fi or Li-Fi, and if unsatisfactory, defaults to attempting to connect to a small-scale cellular network by instructing the cellular transceiver to transmit lower power cellular signals. In a specific example, the user device 202 may be attempting to send a text message to a device outside of the private cellular network environment 200, but since user device 202 is unable to connect to public cellular communication network, user device 202 may attempt to connect to lighting device LD 210 as relay to the public cellular communication network. The processor (not shown in this example) of the user device 202 recognizes that an application of the user device is attempting to send the text message, and may connect to the lighting device LD 210 for relaying of the text message. The user device 202 processor may choose to use the lowest power communication method available.

In addition, the user devices 202-206 may also be configured to communicate within the small-scale cellular network via a peer-to-peer connection. For example, user devices 204 and 206 may establish a peer-to-peer connection via any of a cellular, Wi-Fi or BT connection, if each user device 204 or 206 is equipped with a particular transceiver for the particular radio frequency spectrum and enabled to communicate via the appropriate protocol (e.g., LTE, 802.11xx or BT).

In another example, the small-scale cellular network environment 200 is not only able to support a low-power, short-range cellular network of devices, but is also able to support a private network in which only devices that are within a predetermined range of one another, such as lighting device LD 210, and user devices 202-206, may participate. The devices participating in the private network may not be limited to utilizing a single frequency spectrum (such as cellular only), but may be able to use any that two or more devices are configured to use. For example, so far, cellular, Wi-Fi and BT have been discussed, so each device in the example of FIG. 2 may communicate using one of these communication methods as part of the private network. As shown in FIG. 2, lighting device LD 210 connects to devices via cellular, Wi-Fi and BT. The connection between lighting device LD 210 and user device 0 is via Wi-Fi, while the connections between lighting device LD 210 and user devices 1 and 2 is via a cellular connection, shown as an LTE data line. Assume that the LTE data line connection between the lighting device LD 210 and user device 2 is broken for some reason, the cellular mesh network protocol may attempt to daisy-chain connections to maintain connectivity of user device 2. For example, upon a determination that the LTE data line connection between the lighting device LD 210 and user device 2 is broken, the processor of user device 2 may, via the peer-to-peer connection with user device 1, request permission of the user device 1 processor to access the lighting device LD 2 via the LTE data line connection between user device 1 and the lighting device LD 2. Based on the access negotiations being successful, the user device 2 processor may establish a communication link with the processor of lighting device LD 210.

Before discussing any further implementation examples, it may be appropriate to discuss examples of the structure and configuration of devices that may interact with the above referenced environments 100 and/or 200. These devices may also interact with the private cellular network, the public cellular communication network, the small-scale cellular network and the large-scale cellular communication network.

Figure 3:
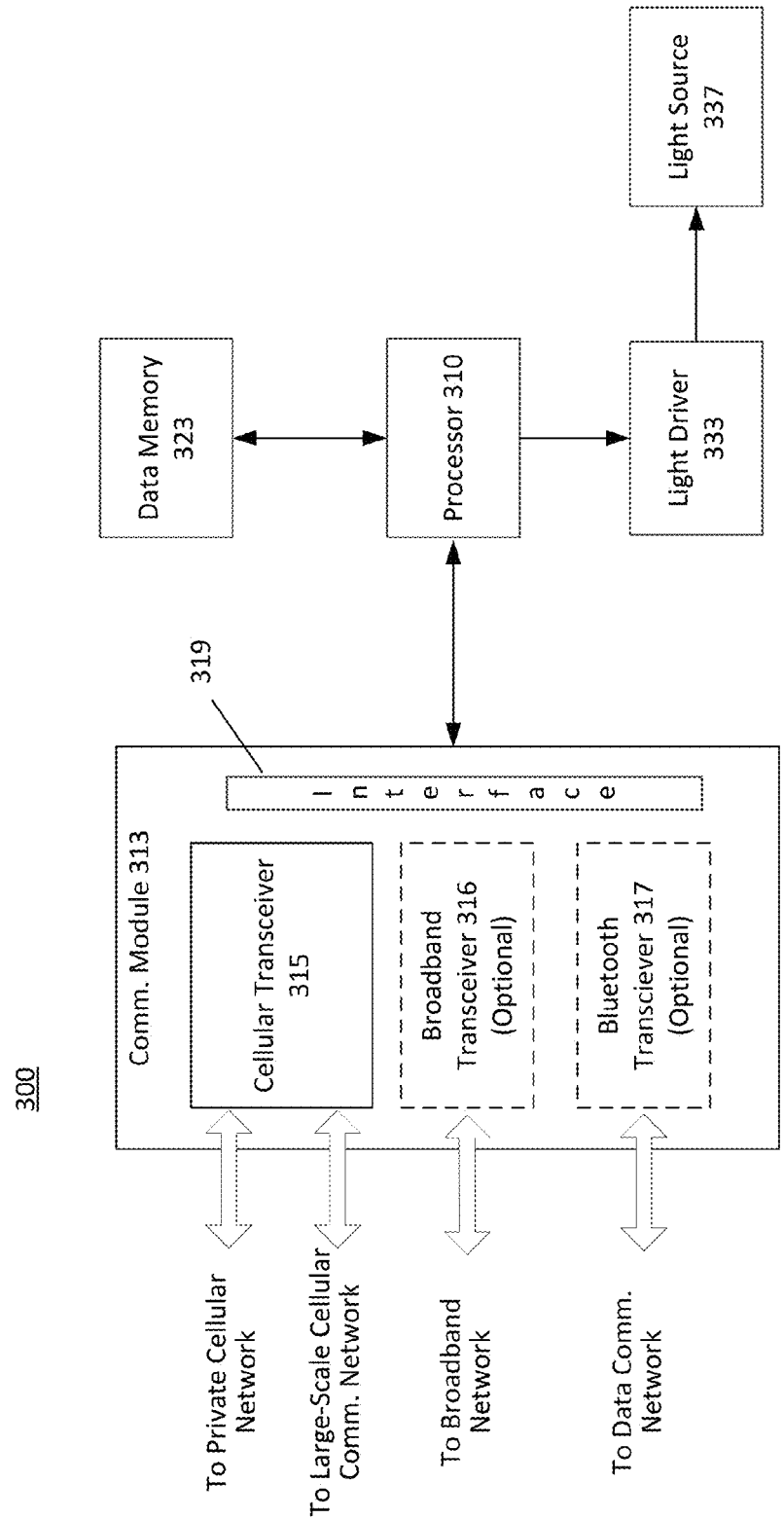
FIG. 3 is a functional block diagram of a simple example of an appropriately configured lighting device.

FIG. 3 is a functional block diagram of an example of an appropriately configured lighting device 300 that is configured to interact with the above referenced environments 100 and/or 200. The device 300 in our example includes a processor 310, a data memory 323, a communication modules 313, a light driver 333 and a light source 337. The light source 337 may be virtually any type of light source suitable for providing illumination that may be electronically controlled. The processor 310 is configured to provide control signals to the light driver 333. The light driver 333 includes circuitry (not separately shown) configured to receive control signals from the processor 310 and output a signal to drive the particular type of light source 337 to output light according to the received control signals. The generated light may be suitable, in general, for illuminating the space in which the lighting device 300 is installed or located.

The data memory 323 may be connected to the processor 310, and may be configured to store data and executable programming code. The processor 310 is a hardware device configured to execute the programming code stored in the data memory 323. By way of example, the processor may be a microprocessor coupled to one or more separate memories or the processor may be a central processing unit within a microcontrol unit that also incorporates some or all of the data memory 323.

The communication module 313 includes a communication interface 319 and a cellular transceiver 315. In some configurations, the communication module 313 may also optionally include a broadband transceiver 316 (such as Wi-Fi) and a Bluetooth transceiver 317. The broadband transceiver 316, in some examples, is a wired connection, e.g., coaxial cable, fiber optic or Ethernet. The communication module 313 may be connected to data communication networks such as a broadband network and a data communication network via the respective broadband and Bluetooth transceivers 316 and 317. The communication interface 319 functions to distribute signals from the processor 310 to the respective transceivers of the communication module 313. The communication interface 319 also processes, converts or otherwise formats signals from the processor 310 into a signal format that the respective transceivers 315-317, if present, are able interpret for transmission.

For example, while the cellular transceiver 315 is configured to enable communication via both the large-scale cellular communication network and the small-scale, cellular network using a first radio frequency spectrum, the cellular transceiver 315 is configured, when the lighting device 300 turns ON, for example, to initially receive low power signals associated with the small-scale cellular network. Since the cellular transceiver 315 uses the same cellular radio frequency spectrum to communicate in both networks, the cellular transceiver 315 may have different configuration settings, e.g., transmit power settings, for use at different times, for connecting to the small-scale cellular network as compared to the configuration settings for connecting to the large-scale cellular communication network. For example, communication within the small-scale cellular network is over a short range (<500 meters) and at low power, whereas communication over the large-scale cellular communication network is at a higher power and over a longer range. As a result, signal power configuration settings are set by the processor 310 depending upon whether the lighting device 300 is attempting to communicate via the small-scale cellular network or the large-scale cellular communication network. For example, in response to a signal from an application, such as a retail store affinity program application, the cellular transceiver 315 broadcasts signals that are low-power and that transmit over only a short-range because the program only wants to establish contact with other devices within a short range of the lighting device 300 executing the application. The other device may be a lighting device similar to lighting device 300. In another example, lighting device 300 is configured to provide relay or other access to large-scale cellular network for user devices in the premises in which the lighting device 300 is installed. The lighting device 300 includes a cellular telephone application, which is stored in memory 323. In response to a request from a user device in the vicinity to connect to the large scale cellular network, the cellular telephone application executing by the processor 315 provides configuration settings to the cellular transceiver 315 that cause the transceiver to transmit at a normal power, and attempts to establish contact with a base station of the large-scale cellular network, such as base station 110 of FIG. 1. Examples of cellular transceivers that may be suitable for use in the described cellular transceiver 315 examples include a broadband high IP3 dual channel downconverter w/ fractional-N phase locked loop and voltage controlled output, 0.7-3.5 GHz from Hittite®, any of the various classes of Snapdragon LTE modems from Qualcomm®, and the like.

The processor 310 is configured to execute programming code, which may be stored in the data memory 323. Upon executing the programming code, the processor performs different functions that will be described in more detail with reference to FIGS. 7 and 8.

Figure 4:
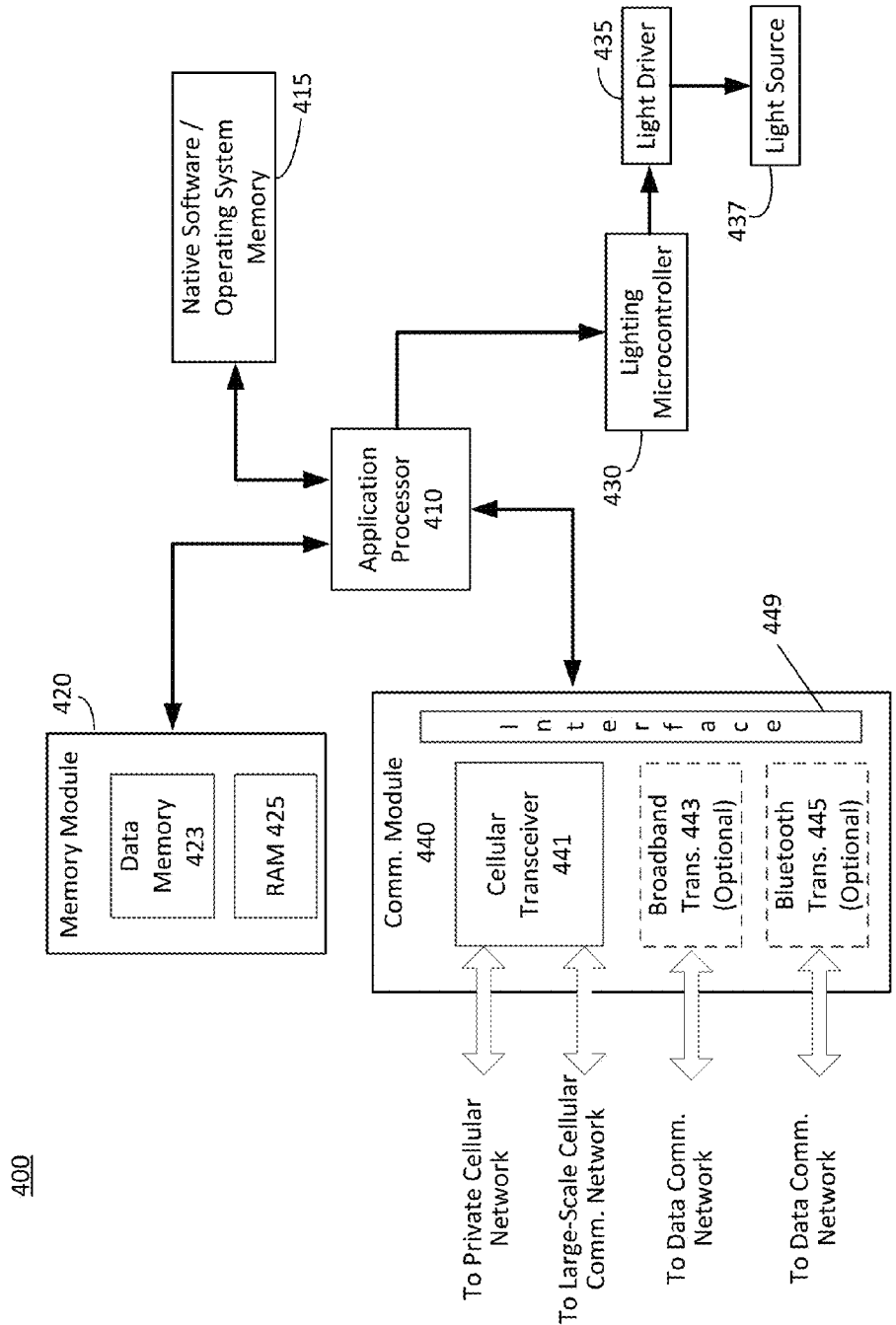
FIG. 4 is a functional block diagram of another example of a lighting device.

FIG. 4 is another functional block diagram of a more complex implementation of a lighting device. In the example illustrated in FIG. 4, the lighting device 400 includes an application processor 410, native software and operating system 415, a memory module 420, lighting microcontroller 430, light driver 435, light source 437, and a communication module 440. The communication module 440 is substantially the same as the communication module 313 of FIG. 3. For example, the communication module 440 includes a communication interface 449, a cellular transceiver 441, an optional broadband transceiver 443 and an optional Bluetooth transceiver 445. The functions of the respective components of the communication module 440 are performed substantially in the same manner as described above with respect to the communication module 313 of FIG. 3.

There are differences between the lighting device 300 and the lighting device 400. For example, the memory module 420 includes a data memory 423 and a random access memory (RAM) 425. Native software, such as a lighting control application, text messaging, and the like, and operating system software/firmware settings may be maintained in a Native Software/Operating System memory 415. Although shown separately for convenience memory 415 may be implemented as part of memory module 420. Examples of software or operating system include Apple iOS, Google Android, Research in Motion's BlackBerry OS, Nokia's Symbian, Hewlett-Packard's webOS (formerly Palm OS) and Microsoft's Windows Phone OS or Windows 8. A computer application such as a text messaging application may be stored in the native software/operating system memory 415 of the lighting device 400 or the RAM 425. In addition, instead of a processor 310, FIG. 4 shows both an application processor 410 and a lighting microcontroller. The light driver 435 of lighting device 400 is controlled via the lighting microcontroller 430, which is responsive to commands from the application processor 410. For example, a lighting control application is stored in the native software/operating system memory 415 or the RAM 425. In response to commands from the application processor 441 executing the lighting control application, the lighting microcontroller 430 sends control signals to the light driver 435, which in turn forwards lighting signals to the light source 437. The driver and source may be similar to those in the example of FIG. 3. The light source 437 is suitable for providing general illumination of the space in which the lighting device 400 is installed.

The application processor 410 executes computer applications and manages functions of the lighting device 400 in response to commands from the executed computer applications. For example, the lighting device 400, in some examples, includes computer applications, of which there may be many, that are stored as programming code in native software/operating system memory 415 and in the RAM 425 of the memory module 420. Certain types of computer applications are native as these native computer applications involve processes that are commonly used by the device such as large-scale cellular networking text messaging applications, voice calling applications, transceiver control application and applications for management of memory devices. Data generated or used by the respective computer applications may be stored in the data memory 423 of the memory module 420. Examples of the types of computer applications that may be accessible by the lighting device 400, as well as user devices, include specific computer programs related to the management of the lighting microcontroller 430, messaging applications, retailer affinity applications, social networking applications, gaming applications, mapping applications, mesh networking applications, entertainment applications, such as video and music applications, digital media creation applications, broadcast applications, such as emergency, weather, and the like. Examples of messaging applications include text messaging, $3^{rd}$ messaging (e.g., within application messaging, such as between users playing a game, or Internet messaging) or the like.

In an example, the lighting device 400 is operating as lighting device LD 2 of FIG. 1 and is installed in a location similar to the indoor location of lighting device LD 2. Similar to the lighting device described with reference to FIG. 3, the lighting device 400 is configured to communicate via the cellular transceiver 441 with a user device connected through the private cellular network or through the large-scale cellular communication network. In some instances, the user device may, when within range, connect with the lighting device 400 through the small-scale cellular network and when out of range of the private cellular network, the user device may connect with the lighting device through the large-scale cellular communication network, for example to control lighting operations of device(s) 400 at the particular premises. The interface 449 functions in a similar manner as the interface 319 of FIG. 3. The interface 449 facilitates connections via the optional broadband transceiver, such as Wi-Fi, or the optional Bluetooth transceiver 445 to a data communication network, such as the Internet or, even to another user device.

The application processor 410 may execute application programming code to provide and/or perform functions related to different types of applications. For example, the application processor 410, in response to a message from an application executing on a user's device (not shown) located in the space in which the lighting device 400 is located, may perform a selected function. In a particular example, the user device message may request information related to the lighting device 400, such as a current status of the lighting device 400; and in response the processor determines the current status and sends a status report message back to the application on the user device. As another example, a message from a user device may be a request for connection to a data network or large-scale cellular communication network. Upon receipt of the connection request, the lighting device application processor processes the user device's connection request and appropriately controls the cellular transceiver to provide the user device with the connection to either the data network or the large-scale cellular communication network, depending upon the connection request and/or the user device application causing the user device to make the connection request. In a configuration, the application processor 410 may be considered similar to a smartphone processor that is configured to allow a user device to connect and communicate with the lighting device 400 (similar to accessories that communicate to or through a smartphone via Wi-Fi or Bluetooth).

Based on the particular applications available to the application processor 410 for execution, the application processor 410 may be configured to participate in any networked communications with or between user devices in the space in which the lighting device 400 is located. At this point, it may be appropriate to discuss applications and how the applications facilitate the integration of lighting devices 400, as well as lighting devices 300 and 500, into the communication infrastructure of the space in which the lighting device is located.

An example of an application is a computer program retrieved from a lighting device memory, from an external memory, or from an application server that may be part of an external data network, such as the Internet, that facilitates the performance of a function. For example, a mapping application may provide directions to a requested location or may identify points of interest for presentation on a display of the requesting user device. Another application example is a lighting control application that operates differently based on the device on which it is installed. In an example, a user device executing the lighting control application is communicatively coupled to a particular lighting device among a number of inter-networked lighting devices located in a space. In the example, when the lighting control application is executing on the communicatively-coupled user device, a graphical user interface (GUI) is presented on the requesting user device with information related to the respective lighting device to which the user device is communicatively coupled. The lighting control application may also have information regarding other lighting devices within the space. While executing substantially the same lighting control application, the lighting device to which the user device is communicatively coupled does not have a display device to present the GUI. However, the lighting device is able to respond to control signals received from the user device based on commands from a user input via the GUI. The lighting device 400, in some examples, is configurable to allow configuration settings and preference settings be manipulated when initially placed at the space or by a lighting management control device, or by a lighting control application executing on user device.

The lighting device 400 may have different sets of configuration settings for different functions. For example, the lighting driver 435 has a first set of configuration settings, while the cellular transceiver 441 has a second set of configuration settings for interaction with devices via the private or small-scale cellular network and a third set of configuration settings for interaction with devices via a public network or the large-scale cellular communication network. Examples of a first set of configuration settings for the light driver 435 may be maximum and minimum intensity settings, duration that power is delivered to the light source 437, such as 16 hours continuously or a range of times that the light source 437 is provided with power, such as 7 AM to 7 PM or the like. Of course, more sophisticated and complex configuration settings for the light driver 435 are envisioned and incorporated. The aforementioned light driver 435 configuration settings may also pertain to the light microcontroller 430 or to the light source 437 or to a combination of components of the lighting device 400. The configuration settings may also be stored in components of the memory module 420, the native software/operating system 415 or both. The memory module 420 may also be used to store a list or look-up table of devices that are members of a private network. For example, as part of a private network using the local, low-power cellular communications, the lighting device 400 processor 410 establishes a look-up table that includes device identifiers, such as an MDN or in the case of a lighting device 400, a pre-assigned identifier or the like. Of course other data storage and retrieval techniques, other than a look-up table, may be used.

In addition to a lighting control application, the lighting device 400 also executes other applications, for example, text messaging applications, telephone applications, retailer affinity applications, peer-to-peer communication applications, mesh networking applications, event applications, news applications, weather applications and the like. Depending upon the different aspects of the respective applications, each such application may be stored in either the native software/operating system memory 415 or in a memory of the memory module 420. For example, due to the need for security, a telephone application (which may have subscriber data) may be stored in the native software/operating system memory 415, which is protected with additional security features (e.g., encryption and/or authentication requirements) rather than in the memory of the memory module 420. Each of these applications may have their own configuration and/or user preference settings, which may also be stored in either memory 415 or 420.

Figure 6:
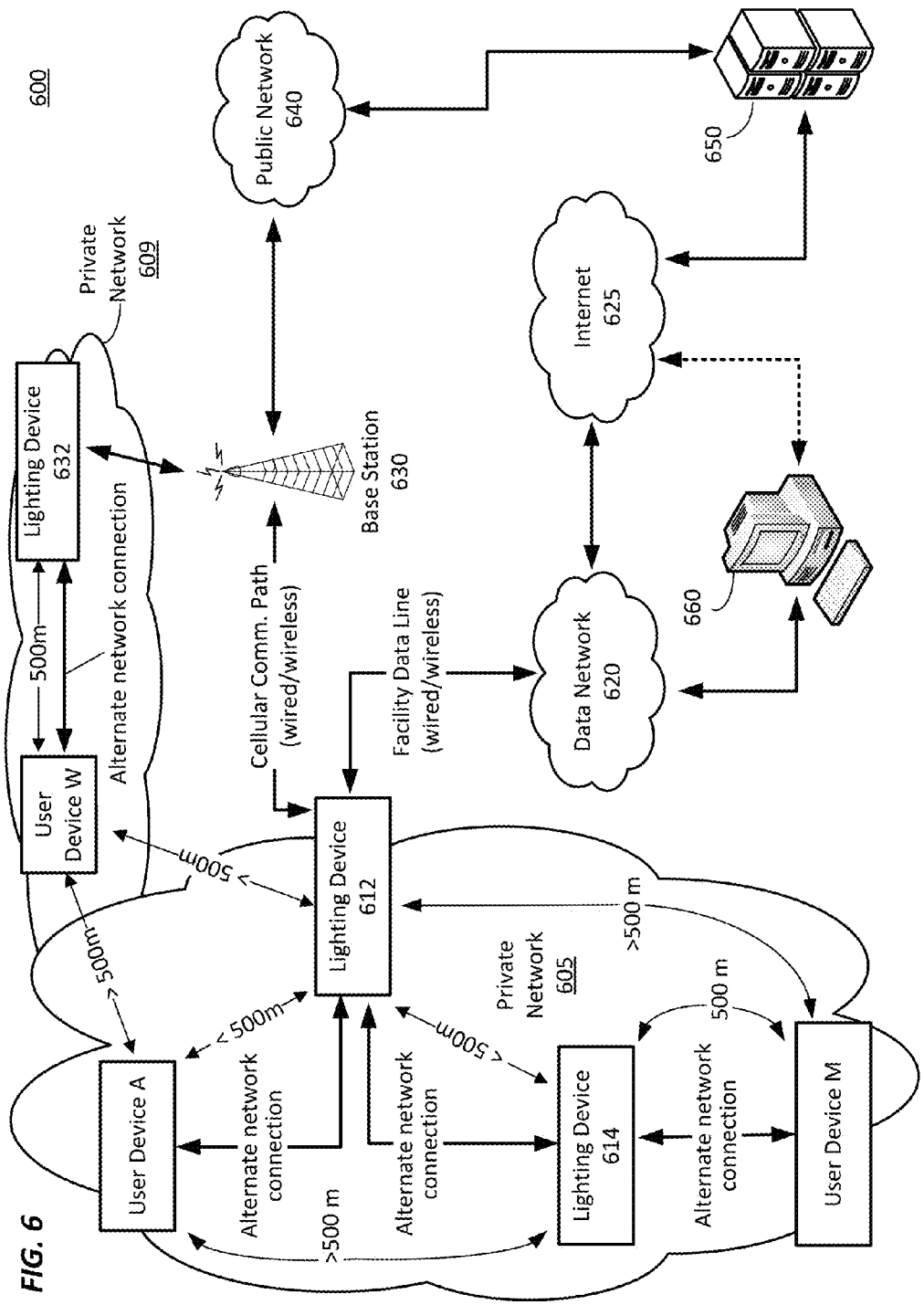
FIG. 6 is system block diagram example of a system of a lighting devices and user devices operating in an example of the networking environment.

In an example described in more detail with reference to FIG. 6, these other applications may be executing on lighting device 400, which enables lighting device to exchange, via the cellular transceiver 441 over the small-scale cellular network, application-related information with user devices that are also executing their own versions of the respective applications. For example, a mesh networking application executing on the application processor 410 of the lighting device 400 may facilitate the establishment of a mesh network with a number of user devices (also executing the mesh networking application) and a number of lighting devices (also executing the mesh networking application) similarly configured as lighting device 400 in the space. In the example, a user device, such as a smartphone, transmits a mesh networking application message that includes an identifier associated with the user device, such as a mobile device number (MDN), International Mobile Subscriber Identity (IMSI), International Mobile Equipment Identity (IMEI) or the like. Note that the respective lighting device 400 and other lighting devices in the space may also have unique identifiers such as an MDN, IMSI or IMEI, so other devices, such as the user devices in the space, are able to identify the lighting devices in the space. Continuing with the example, the lighting device 400 receives the meshing networking application message from the user device. The mesh networking application executing on the lighting device 400 processor 410 uses the user device identifier to maintain a listing of members in the mesh network. The application processor 410 determines approximate user device locations relative to the lighting device 400 by, for example, the measuring user device signal strength to determine approximate user device locations with respect to the lighting device 400. Examples of mesh networking applications include Open Garden® and the Serval Project®, and examples of mesh networking protocols include Babel and dynamic source routing (DSR).

In some examples, the applications on the respective lighting devices and user devices include data in the transmitted message to identify the application and/or the sending device to other user devices and/or lighting device in the mesh network that receive the transmitted messages. As will be described in more detail with reference to FIGS. 6-10, the application processor 410 responds to application messages to provide information or perform an action related to the specific application that sent the message.

Figure 5:
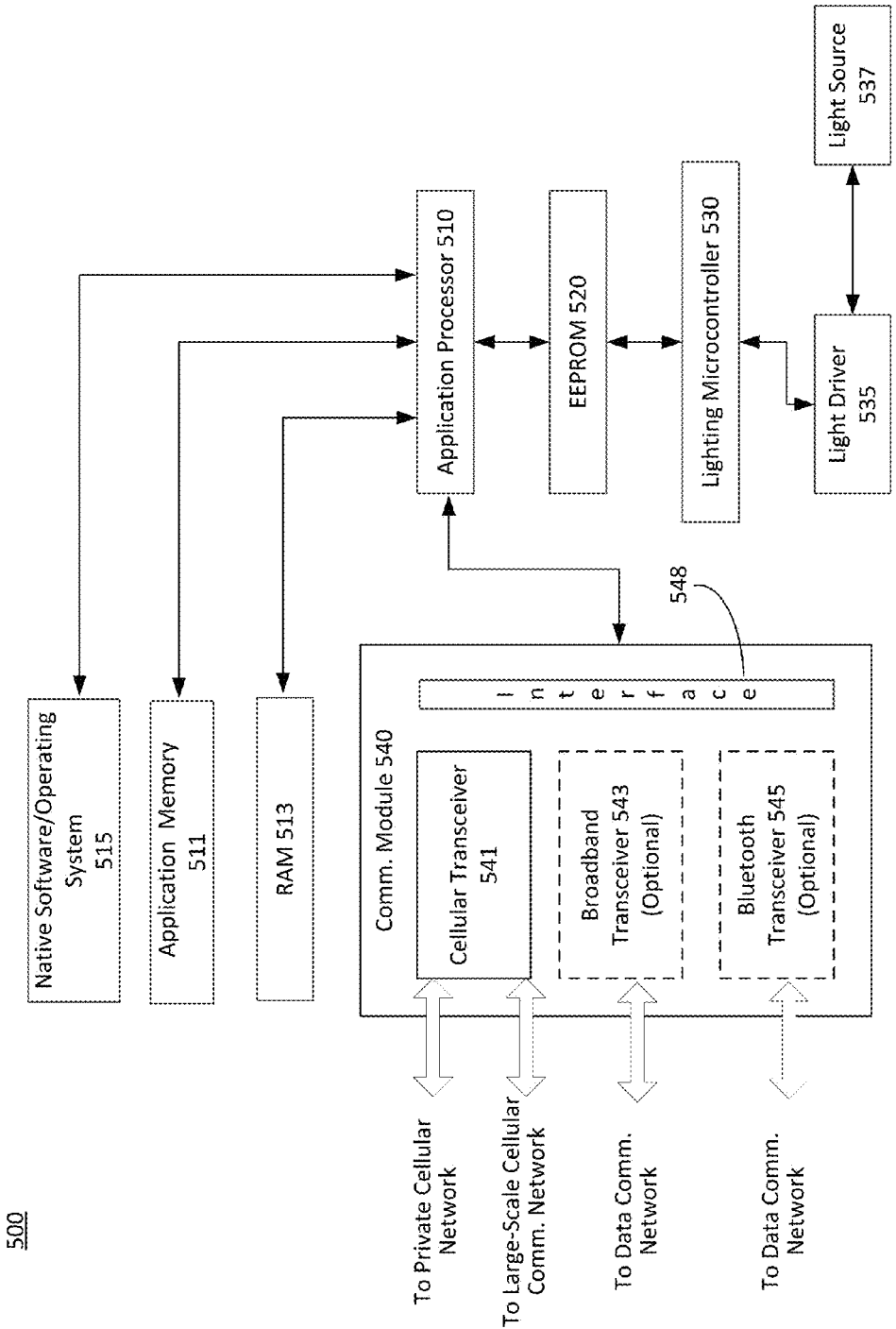
FIG. 5 is a functional block diagram of a more complex example of an appropriately configured lighting device.

FIG. 5 is another functional block diagram of yet a more complex example of a lighting device. In the example of a lighting device 500 illustrated in FIG. 5, the lighting device 500 includes an application processor 510, native software and operating system 515, an application memory 511, random access memory (RAM) 513, lighting microcontroller 530, light driver 535, light source 537, and a communication module 540. The communication module 540 is substantially the same as the communication modules 313 of FIG. 3 and 440 of FIG. 4. For example, the communication module 540 includes a communication interface 548, a cellular transceiver 541, an optional broadband transceiver 543 and an optional Bluetooth transceiver 545. The functions of the respective components of the communication module 540 are performed substantially in the same manner as described above with respect to the communication module 313 of FIG. 3 and/or communication module 440 of FIG. 4. A notable difference between the lighting device 500 and the lighting devices 300 and 400 of FIGS. 3 and 4, respectively, is the electrically erasable programmable read-only memory (EEPROM) 520. The EEPROM 520 is a memory that is used to store configuration and setting codes for managing the light output of the light source 537. Configuration and setting codes may include turn ON/OFF times, an indicator of a group of lighting devices to which the lighting device belongs, lighting brightness settings, lighting transition settings, and the like. The lighting microcontroller 530 is configured to access the EEPROM 520 to retrieve configuration and setting codes, which are applied to the light driver 535 and/or the light source 537.

In an example, the application processor 510 may be configured to receive updated configuration and setting codes for the lighting device 500 from an external source, such as a user device or a management controller, via the cellular transceiver 541, the broadband transceiver 543 or the Bluetooth transceiver 545. The received updated configuration and setting codes may be received by the application processor 510 and stored to the EEPROM 520 for use by the lighting microcontroller 530. For example, based on the configuration of the lighting microcontroller 530, the lighting microcontroller 530 may access the EEPROM 520 at different times, such as every evening, at the onset of daylight savings time, or the like, to retrieve the configuration or setting codes. The configuration and setting code updates may be received from time to time by the application processor 520. The application processor 510 may also be configured to execute computer applications in a manner similar to the application processor 410 in the FIG. 4 example. Examples of cellular transceivers that may be suitable for use in the described cellular transceiver 541 examples include a broadband high IP3 dual channel down-converter w/ fractional-N phase locked loop and voltage controlled output, 0.7-3.5 GHz from Hittite®, any of the various classes of Snapdragon LTE modems from Qualcomm®, and the like. As will be described in more detail with reference to FIGS. 6-10, the application processor 510 responds to application messages to provide information or perform an action related to the specific application that sent the message.

The configurations of the lighting devices 300, 400 and 500 may configured to perform various functions. For example, each of the lighting devices 300-500 when appropriately configured may execute the one or more functions, such as those illustrated in FIGS. 7 and 8.

It may be appropriate now to describe devices such as those described with reference to FIGS. 3-5 in an example system implementation. FIG. 6 is system block diagram example of an implementation of appropriately configured lighting devices and user devices operating in an environment according to the described subject matter. A number of networks are shown in FIG. 6 that interact to provide services to user devices, such as smartphones, computers, tablets and the like. The illustrated networks 605, 609, 620, 625 and 640 also provide services to general appliance devices, such as lighting devices, printers, refrigerators, residential appliances in general, and other devices. The present discussion will be limited to lighting devices and user devices, but other devices, such as printers, appliances and the like may be incorporated into the respective premises, and may participate in the system as a user device.

The system 600 includes private networks 605 and 609, data network 620, Internet 625, and public network 640. Components that facilitate the interaction of the different networks include base station 630 and server 650. Additional devices may connect to the network such as computer 660. The private networks may be a wireless network in which the number of members is limited by the distance the members in the network are from one another. The devices within the private networks, as described above, communicate using licensed cellular radio frequency spectrum, but at a low power that limits the effective range, such as 500 meters, of transmissions between devices. As a result, devices within the range limit of, say, 500 meters, from one another are able to communicate with other devices within the same 500 meter range. For example, the private network 605 may be a mesh network, that is formed within a sports arena, a stadium, a shopping mall, convention center or a similar venue where access to the public network 640 may be limited due to obstructions or interference.

The lighting devices 612, 614 and 632 may all be configured according to the examples described with reference to one of FIGS. 3-5. Similarly, the user devices A, M and W may be configured with an application processor and cellular transceiver as described with respect to lighting devices 300-500 of FIGS. 3-5, but in the form of a smartphone, or other similar user device, such as a cash register or the like, instead of a lighting device.

In the private network 605, a number of lighting devices, 612 and 614, and a number of user devices A and M are shown. Of course, more or less lighting devices and/or user devices may be included. The private network 605 may be established within a shopping mall, for example, in which the access to the public network 640 is limited, in this example, to only the lighting device 612. The lighting device 612 may be within the shopping mall space, but may have a clearer (i.e., having less interference and/or less obstructions) wireless communication path to the base station 630 than other devices in the private network 605. Alternatively, the lighting device 612 may have a wired connection to a suitable antenna, or even a wired connection, to the base station 630. The private network 605 is a cellular network that is established when the user devices A and M come within range, shown as less than (<) 500 meters, of the lighting device 612. Since lighting device 612 is stationary, the lighting device 612 may only interconnect with user devices, such as A and M, that come within the short range (<500 m) limitations of the cellular transceiver when the cellular transceiver is communicating within the private cellular network.

With the appropriate applications executing by an application processor (not shown) within the respective user devices A and M, the user devices A and M may establish communications with the respective lighting devices 612 and 614. For example, user device A may execute a particular application in which a similar instance of the particular application is available to the lighting device 612 for processing any messages related to the particular application that may be received from the user device A. Since user device A is less than 500 m from the lighting device 612, user device A via its cellular transceiver joins the private network 605 using the appropriate mesh networking protocol for joining the private network 605. User device A upon joining private network 605 may communicate with the lighting device 612 and other devices, such as lighting device 614 or user device M in the private network 605.

The connections between the user devices A and M and lighting devices 612 and 614 are labeled as alternate network connections to indicate that these connections are not public network connections (i.e., transmissions from the cellular transceiver at a power setting suitable for public cellular communication network communications), but are private network connections (i.e., low-power, short range cellular transmissions), broadband (e.g., Wi-Fi) or Bluetooth connections.

As background with respect to the particular applications on the respective user device A and the lighting device 612, each of device A and 612 is configured with a processor, such as application processor 410 or 510. Each device may have a number of applications that may be executed by the respective device's processor. The number of applications may be stored in a device memory. Each application may permit users of the application to select settings about the application. The settings may include configuration settings, which are settings as to how the application will interact with other devices, and preference settings, which are user specific settings that a user may select to allow the device to provide different display settings, set a level of detailed information that the application shares, how often the device attempts to share information and the like. The user preference settings may also affect configuration settings. For example, a user preference setting may include the communication mode that the device uses to perform application tasks. So, for example, the user preference settings may include choices between broadband (e.g., Wi-Fi), Bluetooth, private cellular network and/or public cellular communication network. The user by selecting one of these preference settings may indicate the user's preference of communication mode for the particular device.

For example, if the application is a retailer affinity application, the preferred communication mode may be the private cellular network setting so the user receives information about the retailer when the user is close to a retailer location. In contrast, if the application on the user device is a sports reporting application, the user may select the public cellular communication network to ensure that the user receives sports scores whenever the user device has access to the public cellular communication network. There may be hybrid configuration and preference settings as well. Continuing with the sports application example for an explanation of a hybrid setting, suppose one of the user preferences settings allows the user device to receive video of any scoring plays of the user favorite team (e.g., another preference setting). However, the user may not want to use their public cellular communication network connection for the download of video because, for example, the downloaded video will consume a substantial portion of the user's allotted public cellular communication network data plan. As a result, the sports application may provide the user via a user interface on a display (not shown) of the user device with an option to select a communication mode, such as a broadband communication mode, for the download of the video from the sports application. User devices M and W may also be similarly configured to allow a user to make configuration and/or preference setting selections.

Similar to user device A, the lighting device 612 processor may also have settable configuration settings and user preference settings. However, since the lighting device 612 is does not have a display incorporated into the lighting device, a management device such as computer 660, may have access to the lighting device 612 and is able to execute a lighting device management application that allows a user of the computer 660 to select via a user interface the configuration settings. Via command signals from the computer 660, the lighting device 612 processor may be instructed how to communicate with user devices in the space in which the lighting device 612 is located and how to establish a communication path with the base station 630 or with data network 620. For example, the computer 660 commands may include user name and password information as well as other information needed to establish connections with the respective public cellular communication network 640 and the data network 620. The computer 660 may connect to the data network 620 which may be the data network associated with the space in which the lighting devices 612 and 614 are located. As shown in FIG. 6, the connection between the computer 660 and the data network 620 may be direct or may be via the Internet 625. As part of the configuration and/or preference settings, the computer 660 may provide commands that the lighting devices' 612 and 614 processors use to cause the applications to broadcast information related to the respective application. Lighting device 612 may have a primary connection (wired or wireless) to the data network 620. When lighting device 612 receives commands from the computer 660, the lighting device may broadcast the commands to other lighting devices, such as lighting device 614. Alternatively, both lighting devices 612 and 614 may be connected directly to the data network 620 via individual connection paths, such as via Wi-Fi, wired, or the like.

In addition, the computer 660 may be have a lighting controller application that is capable of connecting to the respective lighting devices 612, 614 and 632. As a management device, computer 660 allows a user through a user interface to control the lighting device. For example, the user may set turn ON/OFF times, brightness levels, brightness transitions, and other functions related to the light produced by the respective lighting device 612, 614 and 632. For example, a lighting device, such as 612, may be configured to in response to an input signal received via the data network 620 or the base station 630, delivers lighting control instructions to the light microcontroller (shown in the earlier examples in FIGS. 3-5). In addition, or alternatively, one of user devices A or M may have an application that permits a user to manipulate the lighting device 612 light output.

The mesh networking configuration of the private network 605 allows devices that are not within the short range limit of one device to still connect to the one device by connecting to another device that is within range of both devices. In other words, devices can form a daisy chain that allows a requesting device to connect with a target device, or, said differently, an intended recipient device. An example is appropriate to illustrate the capabilities of devices that are members of the private network 605. For example, lighting device 612 is within 500 meters of lighting device 614. Since the lighting devices 612 and 614 are within the short-range, the lighting devices 612 and 614 are able to communicate via the low-power short range configuration settings of the respective cellular transceivers within the lighting devices 612 and 614. Lighting devices 612 and 614 may be the only permanent members of the private network 605 because they are stationary. User devices A and M may only pass through the short range limit of the lighting devices 612 and 614. For example, user device A is outside the short range limit (i.e., 500 meters) of lighting device 614. However, user device A is within range of lighting device 612. Using the daisy chain capabilities of the private network 605, user device A is able to wirelessly communicate with lighting device 614, and vice versa. So if user device A and lighting device 614 execute a related application, such as a department store affinity application or sport team application, the two devices, user device A and lighting device 614, may exchange application information or other relevant information. Extending the daisy chain further, user device M is wirelessly connected to lighting device 614, which allows user device A to also connect to user device M in the private network 605. The daisy chain would be broken if user device M were to travel outside the short range limit and away from lighting device 614 (and also still be outside the short range limit from lighting device 612). As a result, user device A would not be able to communicate with user device M.

Due to the location of the lighting device 612, the lighting device 612 may be able to offer additional connectivity to the devices within the private network 605. For example, lighting device 612 may be located in the space that is close to a data network 620 extending through the space, or in a location that has adequate signal strength to connect with base station 630, which has access to the public network 640. In this example, the lighting device 614 may be able to provide access to the public network 640 or data network 620 to other user devices, such as user device M, via a daisy chain connection with lighting device 614. The daisy chain connection between lighting devices 612 and 614 may be via a low-power, short-range cellular connection suitable for the private network 605. Alternatively, the daisy chain connection between the lighting devices 612 and 614 may be via a broadband connection, such as Wi-Fi or the like, that may provide a higher bandwidth connection.

In a detailed example, the lighting devices 612 and 614 may be located in a sports stadium and, in particular, located near a food concourse of the stadium. The lighting devices' processors 612 and 614 may have several applications executing, such as a food retailer affinity program application, a sports application for the home and visiting teams playing in the sports stadium at the time, a sports league application, a sponsoring bank application and/or the like. The applications of lighting devices 612 and 614 may have configuration and preference settings that instruct the respective processors to broadcast via the respective lighting device's cellular transceiver in a low-power, short-range setting suitable for the private cellular network a series of broadcast messages. The individual broadcast messages in the series may include information relevant to the respective applications in a series of broadcast messages. The broadcast messages may be received by any devices that are in the short range of the lighting device. Devices outside the short range will not receive the broadcast message because the broadcast message signal strength is not sufficient for the receiving device transceivers at the outer limits of the range (e.g., >500 meters). However, other devices may repeat the broadcast messages so the messages may be received by another user device. For example, lighting device 614 may be configured to repeat the broadcast message from lighting device 612 so devices, such as user device M, may receive the broadcast message.

In a detailed example, the lighting devices 612 and 614 may be located in a sports stadium and, in particular, located near a food concourse of the stadium. The lighting devices' processors 612 and 614 may have several applications executing, such as a food retailer affinity program application, a sports application for the home and visiting teams playing in the sports stadium at the time, a sports league application, a sponsoring bank application and the like. The lighting device 614 may be configured to repeat broadcasts from the lighting device 612, and vice versa. In the example, the series of messages in the broadcast message may be related to the above-mentioned several applications: the food retailer affinity program application, the sports application for the home and visiting teams playing in the sports stadium at the time, the sports league application, and the sponsoring bank application. The broadcast message may include an announcement of a food offer from the food retailer, information about the home or visitor sports team from the home/visitor sports team application, an announcement about scores of other teams' games in the sports league, a bank notice, and the like. Receipt of each of these messages elicits a response from the respective user devices A and M depending on whether the user device has the respective application (for example, the user of user device M may not bank at the sponsoring bank) and, if the user device has access to the respective application any associated configuration/preference settings for the application.

In response to the broadcast messages received from the lighting devices, the respective user device A and M processors decode the broadcast message according to pre-established protocols and/or processes through which the respective processors determine the intended recipient applications of each respective message of the series of messages in the broadcast message. If a user device, such as user device A, does not have a particular application, the processor may make that determination and discontinue processing that message and move on to a next message in the series. Upon decoding the messages, the user device A processor may access the food retailer affinity application stored in the user device memory, or that is executing on the device, and determines user preferences with respect to the received food retailer offer. The user preference settings for the food retailer affinity program on the user device A may indicate to always accept offers for food. In response to the user preference settings, the user device A processor may generate a request for a coupon associated with the food offer, and send the request to the lighting device 612. In response to the received request, the lighting device 612 may process the received request as will be described in more detail with reference to FIGS. 7 and 8. The food coupon will be delivered to the user device A in order to satisfy the request.

In addition, the applications may also have a setting that permits the application to search for other devices that have a similar application. For example, user device A may have an extra hockey ticket for tonight's game. The ticketing application may have a setting that allow user device A to broadcast messages offering the ticket for sale. The user device A processor may generate its own broadcast messages and transmit the broadcast message within the private cellular network. Lighting device 612 may receive the broadcast message from user device A and may rebroadcast the ticket offer message, which is received by the lighting device 614. In turn, lighting device 614 rebroadcasts the message that is subsequently received by user device M and other devices. Other user devices, such as user device M, may have the ticketing application, which may have preference settings to always present offers for tickets when received over a private cellular network. Upon receipt of the broadcast messages, the user device M may generate a response accepting the offer, the chain of communications reverses and the message is forwarded to lighting device 614, which forwards the response message to lightened device 612, which forwards the response message to user device A. Upon completing delivery of the response message, user device A may negotiate a direct communication link with user device M via an available communication mode, such as connecting through a broadband network, the public cellular communication network or some other communication network.

In another example, a lighting device may receive a user device request from an application that is not executing on the lighting device. However, the lighting devices 612 and 614 may have access to applications that are not resident in the memory of the lighting devices 612 and 614 by sending a request to the server 650, which may be an application server. The application server 650 may provide a copy of the application, or provide the requested information to the respective lighting device so the lighting device may provide the requested data to the application of the requesting user device. Using this capability, the user devices A and M in the private network 605 with the lighting devices 612 and 614 are able to participate in more of the messaging being exchanged.

In another example, private network 609 may include a user device W and lighting device 632. The private network 609 may be in an office building that does not have adequate public (cellular communication) network coverage to provide the user device W with service. Meanwhile, the lighting device 632 due to its location within the building does have an adequate signal strength for completing a call to the base station 630 and to the public network 640. When attempting to make a call over the public cellular communication network from the user device W, the lighting device 632 detects the connection attempt by the user device W, and forwards the connection attempt message to the base station 630. The lighting device 632 may detect the connection attempt as a connect to the base station 630 based on information included in the connection attempt request message. In response to the determination that the requesting device is attempting to complete a public cellular communication call via the public network 640 and based on the information included in the connection message, the lighting device 632 forwards a connection request to the public (cellular communication) network 640 via the base station 630. The information included in the connection attempt request message may include the requesting mobile device number (MDN), an MDN of target device (i.e., device being called), public cellular communication network specific information, such as an IMEI, IMSI or the like. In this way, the lighting device 632 is able to facilitate providing cellular communication coverage into areas that do not have adequate public cellular communication network coverage. The inadequate or poor public cellular communication network coverage may also be due to a large number of users being present at the same location and saturating a base station with requests to connect. The present example may be extended to allow the large number of devices requesting access to the public network to gain access to the saturated base station.

Returning to the stadium example involving lighting devices 612 and 614, user devices A and M, due to the large number of public network users in the stadium, may be unable to access the base station 630. However, lighting device 612, in this example, is configured to manage hundreds of communication attempts with the base station 630 from devices within the private network 605. For example, by using the low-power settings of the private network the lighting device 612 identifies the members of the private network, and based on broadcast messages of the identified members is able to identify those members that are attempting to contact the base station 630. The lighting device 612 may have a connection to the base station 630 that allows the lighting device 612 to send a bundle of connection requests on behalf of the identified members of the private network 605, such as user devices A and M, to the base station 630. The bundle of connection requests may be viewed as a single connection request thereby reducing the number of connection requests received by the base station 630. The bundled connection request may be unbundled by the base station 603, and dealt with according to public network 640 protocols.

In another example, the public network 640 may also be a data network that allows devices, such as lighting device 632, to access servers 650 to retrieve information based on requests from user devices, such as user device W, in private network 609.

The lighting devices 612 and 614 may have access to applications that are not resident in the memory of the lighting applications by sending a request to the server 650, which may be an application server. The server request may be delivered either via a connection through the data network 620 and Internet 625, or via the base station 630 and the public network 640. User preferences on the lighting device 612 may indicate which communication pathway is preferred. The application server 650 may provide a copy of the application or provide the requested information to the respective lighting device so the lighting device may provide the requested data to the application of the requesting user device.

The foregoing discussion provided an overview of the capabilities of a system configured with lighting devices and user devices equipped as described with reference to FIGS. 3-5. The following discussion provides examples of the process that an appropriately configured lighting device may perform upon receipt of a broadcast message.

Figure 7:
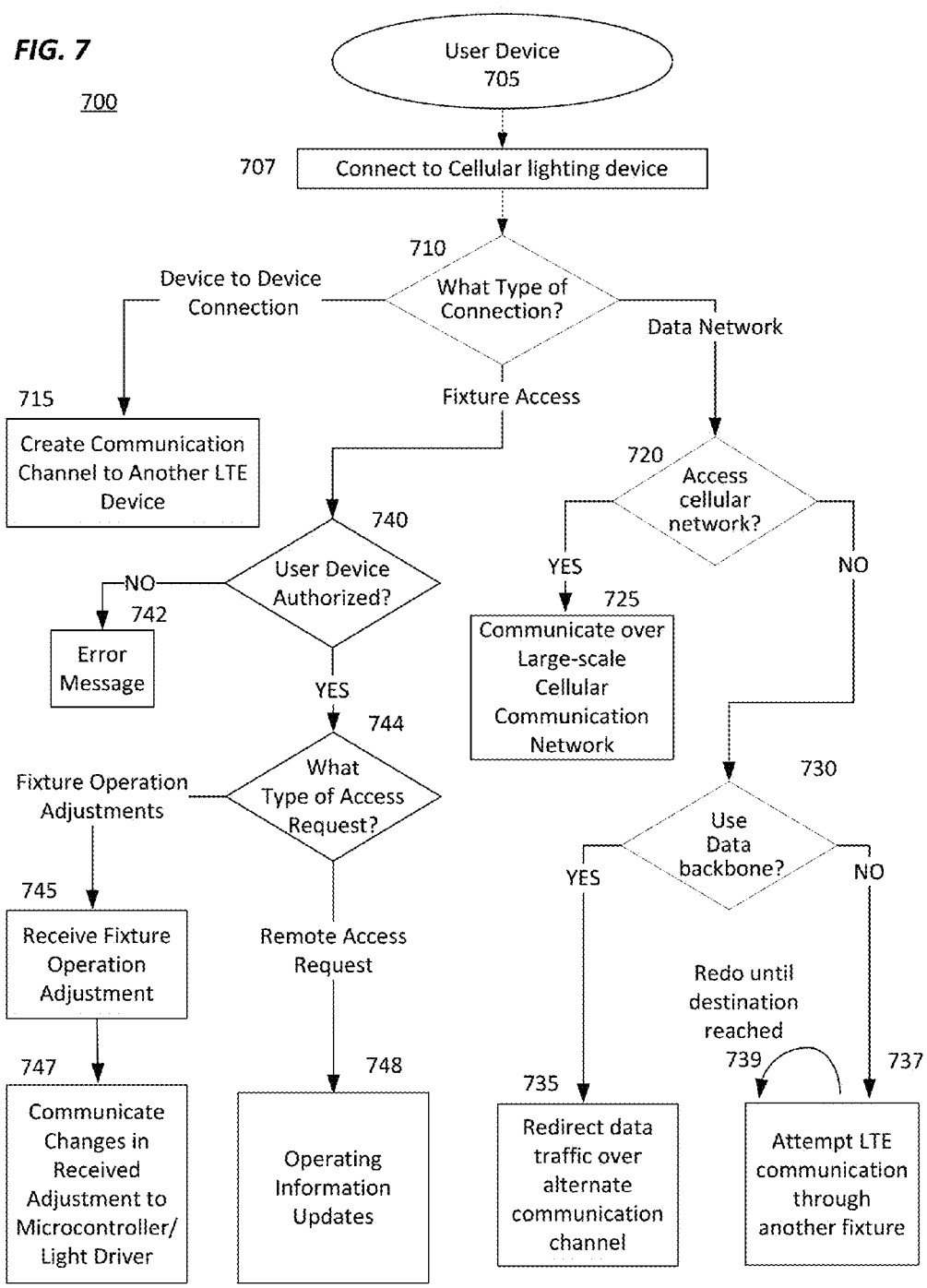
FIG. 7 illustrates a process flowchart for communication between an appropriately-configured lighting device and one or more appropriately configured devices, for example similar to that of FIG. 6.

FIG. 7 is a flow chart of an example of a process flow corresponding to examples of communications between an appropriately configured lighting device and other devices. The communication process 700 illustrated in FIG. 7 operates with communications that are transmitted via the cellular communication spectrum, and, in particular, the short-range, low-power, and private, cellular network. A cellular communication device at 705 connects to an appropriately-configured, cellular-enabled lighting device at 707. The connection between the cellular communication device, such as a user device 123a-c of FIG. 1, and the appropriately-configured, cellular-enabled lighting device, such as 300-500 of FIGS. 3-5, may be formed over a private cellular network using customary handshaking techniques.

For example, while establishing a connection between the lighting device and a user device, the processor may transmit a data message intended for a recipient user device within the small-scale cellular communication network via the cellular transceiver of the communication module. The cellular transceiver of the lighting device transmits a data message using the first radio frequency spectrum. The transmitted data message may include information that is used by the lighting device to identify the user device in the small-scale cellular network. In response to the transmitted data message, the lighting device processor may receive from a user device in the small-scale cellular communication network a response message via the lighting device's cellular transceiver. At step 710, the processor may determine the content of the received response message. For example, based on the received response message, the processor may identify a type of connection that is being requested in the response message. The types of connections may include a direct connection to another user device in range of the lighting device or network of lighting devices, a lighting device access request, a data access request or the like. Upon identifying the connection type, the lighting device processor completes the requested connection according to the identified connection type.

The identification of the particular type of connection being requested may be accomplished using different methods. For example, if a particular application of the user device is establishing the connection with the lighting device, the particular application may include an application identifier with any transmitted messages so a receiving device may process the received message based on the included application identifier. A processor, such as application processor 410 or 510, may receive the message, read the application identifier, call the identified application, and process the message according to instructions provided by the application configuration and user preference settings. A device identifier that is provided, or assigned, by the application may also be included with any messages sent by the respective applications via the user device or by an application executing on the lighting device.

More specifically, in response to the identified connection type being a direct connection, establish a direct connection with the target user device through the large-scale cellular communication network via the cellular transceiver, such as in step 715. Alternatively at step 715, if the device that the requesting user device is requesting to be connected to is part of the small-scale cellular network, the processor may be configured to transmit a data message intended for a recipient device within the small-scale cellular network via the cellular transceiver of the communication module. Regardless of whether the large-scale cellular communication network or the small-scale cellular network is used, the cellular transceiver transmits the data message using a first radio frequency cellular spectrum that is used by both the large-scale cellular communication network or the small-scale cellular network.

In another example, upon establishment of a direct connection between the lighting device and a user device, the lighting device processor may, at step 710, identify the connection type as a connection type different from the device-to-device request connection type. For example, the processor may determine the connection type to be a fixture access request connection type. In response to such a determination, the process 700 may proceed to 740.

The lighting device processor, at 740, determines based on user device authentication that the requesting user device has permission to access the lighting microcontroller. For example, the user device may be authenticated based on authentication information related to application information exchanged between the application on the user device and an application executed by the lighting device processor. The authentication information may be, for example, a username and/or password that the lighting device processor has been configured to accept as permitting remote access to the lighting device the user device application may have provided. Based upon the determined permission, authorization or authentication, the process 700 may proceed to 744. However, if the processor determines, at 740, that the user device is not a device authorized to access the lighting driver of the lighting device, an error message is generated at 742 and is returned to the user device. For example, the requesting application on the user device may present an error message on a display (not shown) of the user device, or some other indication may be provided.

At 744, the processor determines, based upon information in the fixture access request, whether the fixture access request is providing instructions, such as fixture operation adjustments, or is attempting to make software or firmware adjustments to the light microcontroller. Based on the determination at 740, the processor executes functions in an attempt to satisfy the received fixture access request. If the processor determines that the fixture access request is requesting fixture operation adjustments, the process 700 proceeds to 745. At 745, after the appropriate handshaking, such as authenticating the user device as a device appropriate to interact with the lighting fixture to control operation of the lighting driver, the processor requests control signals from the user device. Alternatively, the fixture access request may already include the control signals. In either case, the processor receives fixture operation adjustment settings from the user device via the cellular transceiver. At 747, in response to receiving the fixture operation adjustment settings from the user device, the processor communicates the received fixture operation adjustment settings to the light microcontroller or light driver. The fixture operation adjustment settings received from the user device may be received via the cellular transceiver of the lighting device. The lighting device cellular transceiver may be configured to receive the fixture operation adjustment settings via the small-scale cellular network and/or the large-sale cellular communication network. Depending upon the configuration of the lighting device, the fixture operation adjustment settings are either in a format executable by the light microcontroller or light driver or in a format convertible by the light microcontroller or light driver.

Returning to 740, if the processor determines that the fixture access request is requesting remote access based on user permissions, the process 700 proceeds to 748. At 748, the requesting device, whether a management device as described in the example of FIG. 7, or a user device, delivers updated operating information, such as at least one of a software update or a firmware update, to the lighting microcontroller, the light driver and/or light source.

In another example, the lighting device processor may determine that another type of connection is being requested by the requesting user device. Returning to step 710, the processor may determine that the type of connection requested by the requesting user device may be a data network request. A data network request is a request by the user to device to connect to a data network to receive data, such as a connection to the Internet, a connection to an intranet of the space in which the lighting device is installed, or a connection to the large-scale cellular communication network.

In response to a determination that the connection type is a data network request connection type, the process 700 may proceed to step 720. At 720, the lighting device processor may request from the requesting device that sent the received data, information related to a data network that the user device is requesting to connect. For example, the requesting device may be requesting connection to the intranet of a business in which the lighting device is installed. The lighting device may be configured to have connections to an intranet of a business in the space that the lighting device is connected. For example, if the lighting device is located in an engineering firm, the lighting device may serve as a wireless access point for the user devices, such as tablets, smartphones or cell phones, to connect to the firm's data network. Or, if the space in which the lighting device is located is a shopping mall, there may be multiple intranets that the lighting device may serve as an access point. For example, the shopping mall may have an intranet that extends throughout the shopping mall premises, and individual retail stores, such as a department store, in the shopping mall may have its own intranet. This type of data network may considered a data backbone request, which is a request to connect to the data network associated with the space in which the lighting device is located. Alternatively, the lighting device processor may perform a different process if the request is for the Internet or a specific website not associated with the space in which the lighting device is installed. For example, in the above-mentioned shopping mall scenario, a restaurant may not be located in or around the shopping mall, and a user may wish to view a menu of the restaurant. The user may cause the user device to request access to the restaurant's website, which may not be available on or through the shopping mall intranet. As a result, the lighting device processor may process the request to determine whether the user device needs to access a cellular network in order to fulfill the user device's data request. If the determination is YES, the user device needs access to a cellular network to satisfy the data request, the lighting device, at 725, may access the large-scale cellular communication network or the public cellular communication network and communicate the data request over the large-scale cellular communication network or the public cellular communication network.

For example, in response to the determination that cellular communication network access is required to satisfy the data network connection request, the lighting device processor, which is serving as the large-scale cellular communication network access point for the user device, may forward a connection request to a large-scale cellular communication network base station via the cellular transceiver of the communication module. The lighting device processor may have requested or been provided with user device information that facilitates the connection with the large-scale cellular communication network. For example, the device information may include information such as device power supply status, device communication mode preferences, device identifier, device cellular communication service provider, or a device user name. The foregoing presumes that the large-scale cellular communication network is available to the user device.

However, the large-scale cellular communication network may be unavailable because the space in which the user device is located may not have signal strength that is adequate for communicating with the large-scale cellular communication network. Thus, if the determination is NO, the user device does not need access to a cellular network to satisfy the data request, the lighting device, at 720, may proceed to 730 at which a determination may be made whether the data backbone is sufficient to satisfy the data request. If the determination at 730 is YES, the data backbone may be used to satisfy the data request, the lighting device processor may redirect the establish connection to an alternate communication network, such as Wi-Fi (i.e., 802.11xx) or Bluetooth (including Bluetooth-low energy) for transmission of the data. In other words, instead of exchanging the data over the small-scale cellular network as presently being used, the lighting device may assist the user device to connect to a Wi-Fi or Bluetooth network in the space that allows the user device to receive the requested data. For example, the lighting device processor may request information from the user device, such as an identifier, user name, password or the like, as well as a an indication of the type of network (e.g., Wi-Fi, Bluetooth or other) that is preferred by the user device. Upon receipt of the information related to the data network and the user device, the lighting device processor may send a request to the preferred data network requesting a communication channel be formed between the user device and the data network (735). The lighting device processor may also use the user device provided information to determine whether the device is permitted to connect to the data network based on the identifier.

Transferring the user device from the small-scale cellular network may reduce interference in the small-scale cellular network and also frees the processor resources to allow the lighting device to engage in brief communications over the small-scale cellular network.

Returning to step 730, the processor may determine that the data backbone is not needed for the data network request because, for example, the data network within range of the user device does not have the data or does not have access to the data. For example, returning to the shopping mall scenario, the user device may be requesting data of a distant retailer located at the opposite end of the shopping mall from where the user device is presently located within the shopping mall. In addition, the shopping mall intranet does not provide access to the distant retailer's website or intranet (for example, for security reasons). However, a lighting device located close to the distant retailer may have access to the distant retailer's wireless intranet access point. Accordingly, the lighting device that is processing the user device request determines, at 730, that use of the data backbone is not an option, in which case the process 700 proceeds to 737.

At 737, the lighting device processor attempts to locate a near-by, and similarly configured, lighting device to inquire about accessing the distant retailer's wireless intranet. A similarly configured, or appropriately configured, lighting device would be a lighting device configured as discussed with reference to FIGS. 3-5, or any lighting device capable of communicating via the small-scale cellular network using the cellular radio frequency spectrum. The attempt to locate a near-by, and similarly configured, lighting device may be a transmission via the cellular transceiver in a transmission mode suitable for use in the small-scale cellular network. The transmission may contain an inquiry message inquiring if any appropriately configured lighting device has access to the distant retailer's intranet (Step 737). This is the scenario in which a mesh network implementation of the lighting devices becomes useful. In such a mesh network implementation, the inquiry message is passed from the first lighting device that initially broadcasts the inquiry to other lighting devices, which if unable to positively respond to the inquiry, re-broadcast (Step 739) via another low-power, short-range transmission of the inquiry message until the inquiry message receives a positive response from a lighting device. Common mesh networking protocols may be used to perform the functions to accomplish steps 737 and 739.

Figure 8:
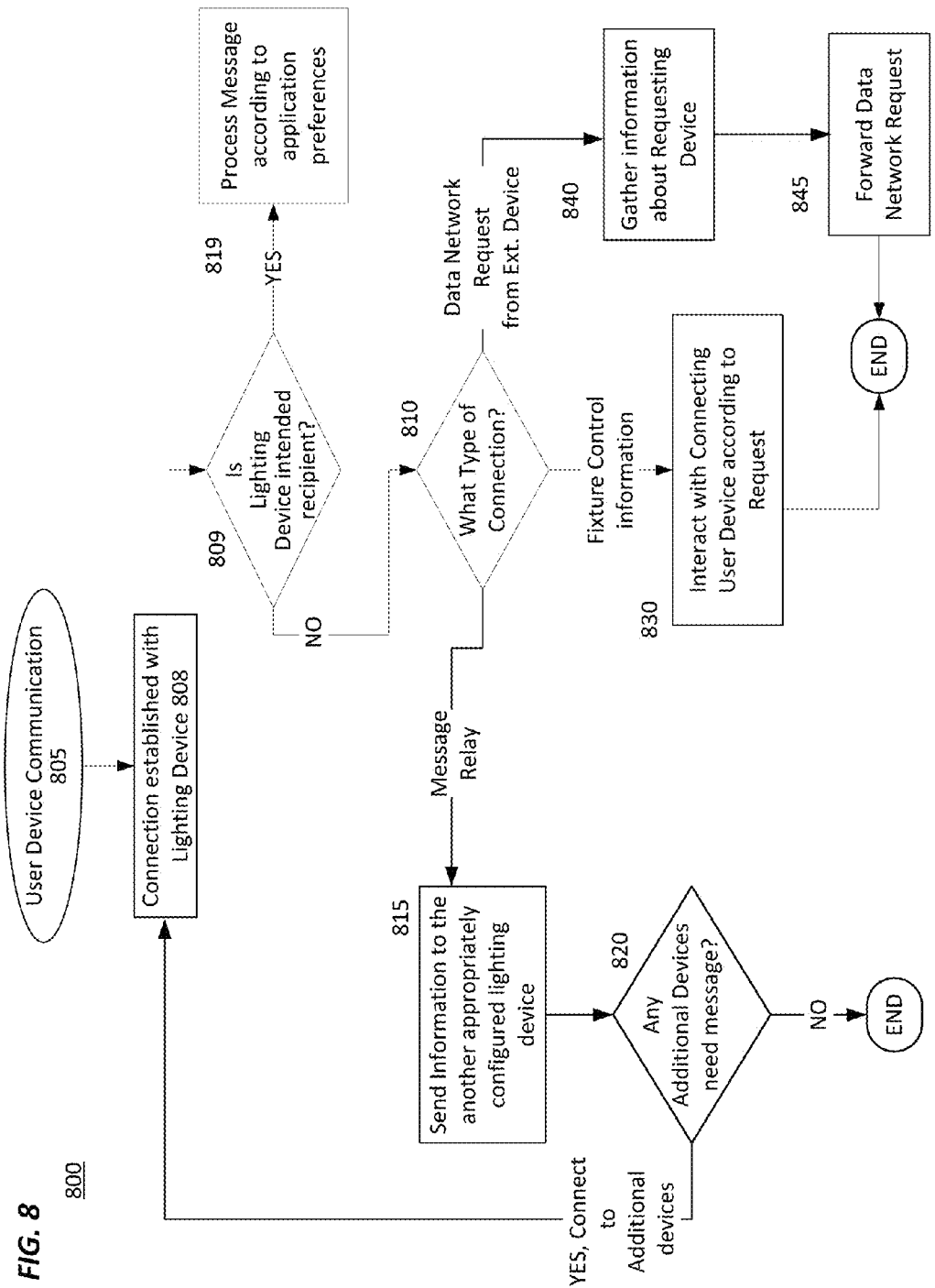
FIG. 8 illustrates another process flowchart for a communication between an lighting devices, for example, similar to those of FIGS. 3-5, and one or more other devices.

Other processes may also be implemented, such as the example provided in FIG. 8. FIG. 8 illustrates a process flowchart for communication between a lighting device as described in FIGS. 3-5 and one or more user devices. The process 800 of FIG. 8 may be implemented by a lighting device communicating via the cellular transceiver as described in any of FIGS. 3-5. The lighting device cellular transceiver may be configured to use the cellular radio spectrum and initiate communications with other devices in the space that the lighting device is located through a private cellular network. Examples of other devices in the space include printers, facsimile machines, reproduction machines, imaging devices, mobile devices, tablet devices, appliances, vending machines, point-of-sale devices, food preparation machines, vehicles, emergency equipment, premises security sensors, cameras and entertainment devices, such as televisions, audio output devices (e.g., music players) and recording devices, and the like. Another device that may communicate with a lighting device may be a management device, which may be, for example, a device that manages the lighting fixture (such as a building automation device or a network device), such as device 660 of FIG. 6. A private cellular network, like the above referenced small-scale cellular network, is configured with devices that communicate via low power, short range signals. For example, the private cellular network may use available LTE cellular radio frequency spectrum over a short range, which may be, for example, approximately 500 meters. The process 800 begins at step 805.

At 805, a user device attempts to establish communicates with a lighting device. The lighting device is configured as part of the private cellular network, and at 808, the user device and the lighting device are connected in the private cellular network. The lighting device in addition to the cellular transceiver is optionally configured with a broadband transceiver and/or a Bluetooth transceiver. The lighting device may be configured to switch between the various transceivers to communicate with other devices capable of communicating via the optional transceivers. Upon establishing the connection with the lighting device through the private cellular network, the user device may transmit a connection message that is received by the lighting device. The lighting device processor, at 809, evaluates the received connection message and determines whether the lighting device is the intended recipient of the connection message. If the determination at 809 is YES, the lighting device is the intended recipient, the process 800 proceeds to 819. At 819, the lighting device processor processes the received connection request according to the application preferences associated with the connection request. For example, the connection request may be related a lighting control application of the lighting device or some other application. Based on the lighting device with which the connection was made at step 808, the lighting device processor may have preset preferences as to how the lighting device responds to the connection request. If the determination is NO at 809, the process 800 proceeds to step 810.

At 810, the lighting device processor analyzes the received connection message to determine a type of connection that the user device is requesting. For example, each type of connection message may include a set number of bits that indicate the type of connection message. The lighting device is capable of making several types of connections, such as a message relay connection, a fixture control information connection and a data network request. A message relay connection message may be a request for information that if unfulfillable by the receiving lighting device, is retransmitted to another appropriately configured lighting device that may be able to satisfy the request. For example, the user device may not have an adequate signal strength to connect to a public cellular communication network base station because the user device is located far indoors in the space, which results in a base station signal strength that is not adequate to accommodate a connection. However, some lighting devices (e.g., lighting device 612 of FIG. 6) in the space may be positioned at a location in the space that provides adequate base station signal strength to complete a call over the public cellular communication network.

In response to the lighting device processor determining that the requesting user device is requesting a message relay step 810, and proceeds to step 815. At 815, the lighting device processor forwards information received from the requesting device by broadcasting the information in a connection request message to other devices that are appropriately configured in the private network. The broadcast message is broadcast via the cellular transceiver, but is a low-power transmission that is only transmitted over a short range. As part of the private network, the lighting device processor may establish a list or look-up table of devices that are members of the private network. The look-up table may include device identifiers, such as an MDN or in the case of a lighting device a pre-assigned identifier or the like.

Since the message is a broadcast message, at 820, the processor identifies, via the look-up table or other data structure, other devices in the private network that may need to receive the message, such as those devices, that have already received the message. In response to a determination that YES, connect to other devices, the process returns to 808, and the above determinations at steps 810, and 815 repeat until the determination at step 820 is NO, and the process 800 ends.

In an alternative example, at 815, the processor may identify a specific lighting device as having to receive the information associated with the connection request. For example, the message relay may be needed to change configuration settings of a particular lighting device, such as a lighting device in the basement level of a facility. As a result, the connection request message may include a specific identifier associated with the lighting device that identifies the lighting device that is the target recipient of the connection message. Therefore, the message generated at 815 may be specifically addressed to another specific lighting device in the space. At 820, the processor determines that YES another device must be contacted the process 800 proceeds base to 808 to attempt a connection with the specific device. If, however, the lighting device processor determines at 820 that another device does not need the message, then the process 800 ends. The target recipient device and the requesting device may create a peer-to-peer connection via the devices' respective cellular transceivers (or Bluetooth transceivers or broadband transceivers) to exchange information directly without any further interaction with the lighting device.

Instead of the lighting device processor making a determination that the connection request is a message relay, the processor may determine that the connection request is related to either fixture control information (e.g., a status request or update) or a data network request from the connecting device. Returning to step 810, the processor may determine that the type of connection is a fixture control information request. Upon a determination that the connection request is a fixture control information request, the process 800 proceeds to 830. Using the connection between the requesting device established at 808, the lighting device processor, at 830, interacts with the connecting user device according to information included in the connection request. For example, the user device may be requesting lighting device lighting configuration settings (e.g., brightness settings, ON/OFF times, hours of use, software/firmware version, or the like). Alternatively, the request may be a command to update software and/or firmware of the lighting device, and/or a command to change a lighting device configuration setting, such as ON/OFF times, brightness levels or the like. Upon completion of the fixture control information request, the process 800 may end.

In another example, instead of the lighting device processor making a determination that the connection request is a message relay or a fixture control information request, the processor may determine that the connection request is related a data network request from the connecting device at step 810. Upon a determination that the connection request is a data network request, the process 800 proceeds to 840. At 840, the processor may gather information relevant to the requesting device and the type of network that the requesting device is requesting to connect. For example, if the data network the requesting device is requesting to connect is the large-scale cellular communication network, or public network, the, processor may request an MDN, IMEI or IMSI of the requesting device at 840. Upon receipt of the requested information from the requesting user device, the lighting device processor via the cellular transceiver (which is in a high-power mode suitable for use in the large-scale cellular communication network) may transmit, at 845, to a base station associated with the large-scale cellular communication network, such as base station 630 of FIG. 6, for attachment to the large-scale cellular communication network. Upon successful attachment of the user device to the large-scale cellular communication network, the lighting device may act as a repeater device to maintain the user device's connection to the large-scale cellular communication network, and process 800 ends.

Figure 9:
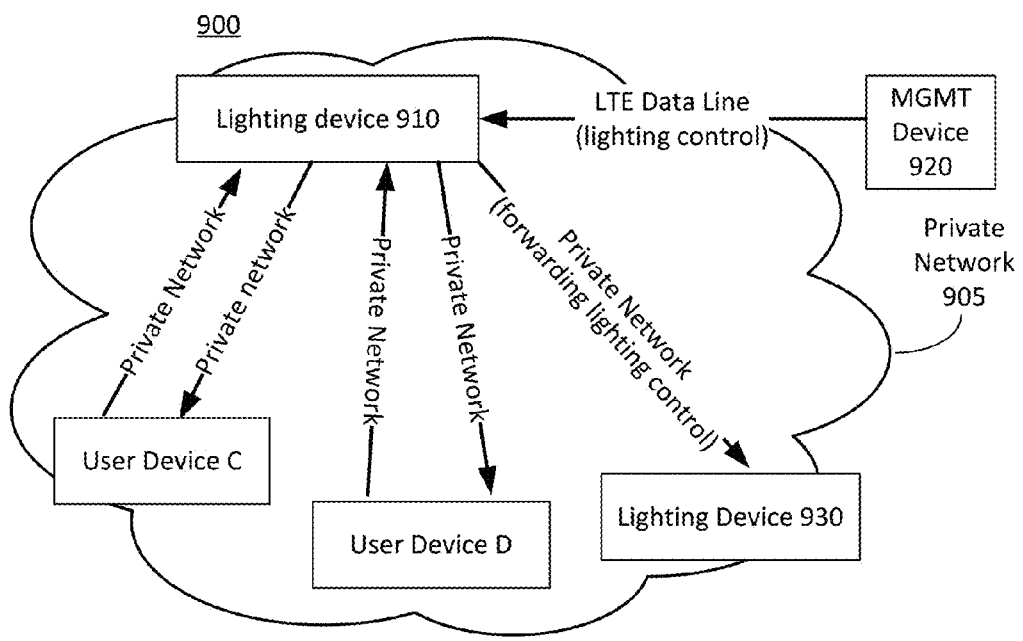
FIG. 9 illustrates an example of an operating scenario of appropriately configured lighting devices operating in a small-scale cellular network.

FIG. 9 illustrates an example of an operating scenario of appropriately configured lighting devices, a management and user devices operating in a small-scale cellular network and a large-scale cellular communication network according to an embodiment of the disclosed subject matter. The scenario 900 illustrated in FIG. 9 includes lighting device 910, a management (MGMT) device 920, lighting device 930 and user devices C and D. Each of the lighting devices 910 and 930 are similar in configuration as one of devices 300-500 as shown in FIGS. 3-5. In addition, user devices C and D are configured to include a cellular transceiver configured to communicate over a private network 905, such as a small-scale cellular network, as well as a large-scale cellular communication network (not shown). The lighting devices 910 and 930 may be positioned at different locations within the same space, such as a retail department store, home improvement warehouse store, or grocery store. The locations of the lighting devices 910 and 930 allow the lighting devices to form private network 905. User devices C and D may also join the private network 905 based on their short range proximity (not shown) to lighting device 910. Of course, as explained with reference one or more of devices, C and D, may have join the private network 905 via a connection to lighting device 930. Management (MGMT) device 920, which may be similar to computer 660 of FIG. 6, is external to the private network 905. Alternatively, the MGMT device 920 may be a smartphone, tablet or the like.

The lighting device 910 is further configured to act as a private network 905 facilitator for other devices in the space. For example, the lighting device 910 acts as an access point for devices, such as MGMT device 920, external to the space. In the scenario 900, the lighting device 910 is shown receiving information from the MGMT device 920 The information may be lighting control information, such as commands to turn ON, a firmware update information, or the like. The connection between the lighting device 910 and the MGMT device 920 may be a high-power cellular radio frequency spectrum signal that is transmitted within the large-scale cellular communication network, or public cellular network.

The MGMT device 920 lighting control message may be directed to lighting device 930, but may also be directed to lighting device 910. In other words, MGMT device 920 may be attempting to control both lighting devices 910 and 930. The lighting device 910 receives the lighting control message from the MGMT device 920 via the lighting device's 910 cellular transceiver, which as mentioned is set to receive signals via the higher power settings associated with the large-scale cellular communication network. Upon receipt of the lighting control message, the lighting device 910 process determines that the lighting control message is intended for lighting device 930, which is a member of the private network 905 with lighting device 910. In response to the determination that lighting device 930 is a member of the private network 905, the lighting device 910 alters the cellular transceiver settings from a high-power transmission setting to a low-power transmission setting suitable for transmitting cellular radio frequency signals in the private network 905. Using the lower-power cellular signals suitable for transmission in the private network 905, the lighting device 910 forwards the lighting control signals to the lighting device 930.

As for user devices C and D, these devices may broadcast messages pertaining to applications accessible (e.g., executing or stored in the user device memory) to each of the respective user device Similarly, lighting device 910 may broadcast messages related to applications accessible to the lighting device 910. Upon detection of an application-specific message within the broadcast message, the respective device, such as user device C, may respond to the lighting device with a connection message. The connection message may request additional information regarding the application-specific message within the broadcast message. The lighting device 910 and user device C may exchange additional information in response to the connection message. For example, the space in which the private network 905 may be located may be an office building that has a deli in it, and the deli is offering a lunch special using a popular social application.

The lighting device 910 may broadcast a message related to the popular social application in which the message also identifies the deli or the deli's offer. The user devices C and D receive the broadcast message from the lighting device 910. Since only user device C has access to the popular social application, the user device C processor responds to the broadcast message and receives more information such as an electronic coupon or the like, in order for user of user device C to receive the lunch special offer. User device D may be configured to respond to other application-specific messages in the broadcast messages and/or the like. Of course, other scenarios are envisioned.

Figure 10:
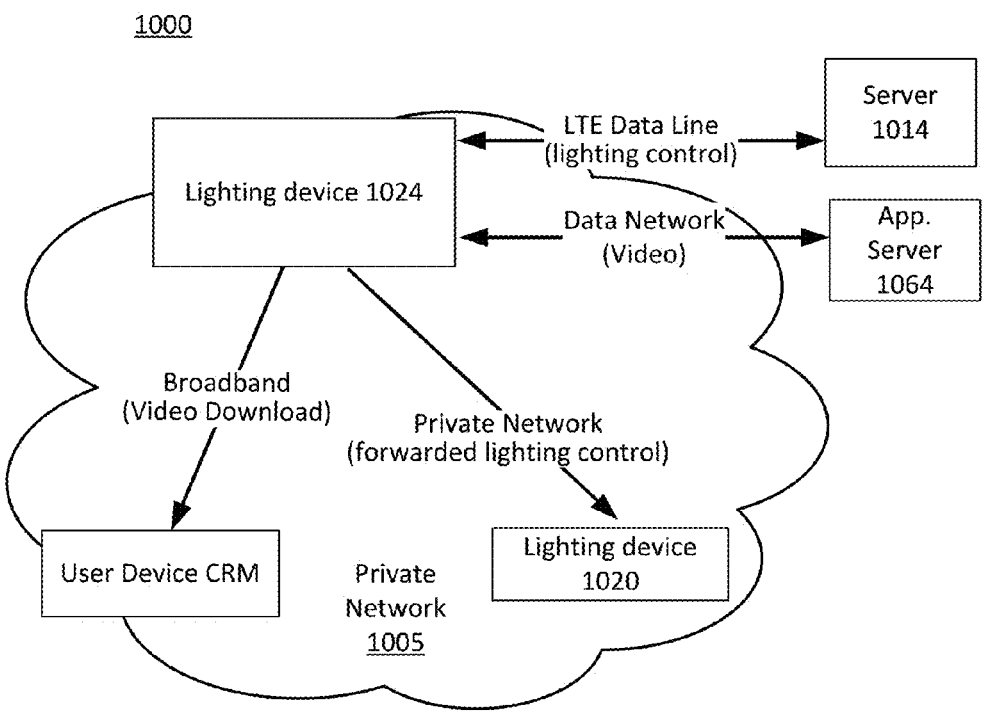
FIG. 10 illustrates another example of an operating scenario of appropriately configured lighting devices operating in a small-scale cellular network.

For example, FIG. 10 illustrates another example of an operating scenario of appropriately configured lighting devices operating in a small-scale cellular network according to an embodiment of the disclosed subject matter.

In the scenario 1000, private network 1005 is formed in a space occupied by lighting devices 1024 and 1020, and user device CRM. The lighting device LD 1024 may be configured to have access to a data network, such as data network 620 of FIG. 6, and to a public network, such as network 640 via a base station 630 also in FIG. 6. The space in which the lighting devices 1024 and 1020 may respond to commands from server 1014. Server 1014 is configured as a facilities manager server, and may manage the operation of the lighting devices 1024 and 1020 in the space.

In the illustrated example, lighting device LD 1024 may be an access point to the space for the server 1014. In other examples, the server 1014 may have connections to all lighting devices within the space, or may have access to several lighting devices that act as access points. For ease of explanation, only lighting device LD 1024 will be described as an access point and distributor of received communications in the private network 1005, but it is envisioned that other devices may act in the same capacity. The connection between the lighting device LD 1024 and the server 1014 may be via a large-scale cellular communication network. Lighting device LD 1024 may also be configured to utilize its connection to the data network to satisfy data network requests from user device members in the private network 1005. Via the data network, the lighting device LD 1024 may have access to an application server such as application server 1064. Similar to the lighting devices 300-500 of FIGS. 3-5, the lighting device LD 10124 may be configured with multiple transceivers, some of which may have selectable power settings to permit high-power transmission and low-power, short-range transmissions. The lighting device LD 1024 connections to the respective servers 1014 and 1064 may be via a large-scale cellular communication network cellular transceiver settings, broadband settings, such as Wi-Fi or Li-Fi, or the like.

Consider the example, in which user device CRM requests access to a data network to retrieve video data. User device CRM may communicate with the lighting device LD 1024 using its cellular transceiver set to a mode that allows low-power cellular radio frequency transmissions suitable for use in the private network 1005. Via the cellular transceiver, the user device CRM transmits a message including a data network request. In response to receiving the data network request, the lighting device LD 1024 negotiates on behalf of the user device CRM a connection to the data network (not shown). Upon completion of the connection, the user device CRM may gain access to the application (app) server 1064 through the lighting device LD 1024, and exchange information that results in the app server 1064 providing video information to the lighting device LD 1024 for distribution to the user device CRM. For example, a video player application of the user device CRM may have generated a data network request for a particular video file. However, lighting device LD 1024 may be configured to facilitate the use of radio frequency resources in the private network 1005, so the radio frequency resources are used in as most efficient manner as possible. In the present example, the cellular radio frequency of the private network is bandwidth limited and is not configured to deliver substantial amounts of data, such as a video or large data download. For example, the low-power, range limited cellular transmissions are configured to deliver kilobytes (KB), not megabytes (MB) of data.

As a result, the lighting device LD 1024 may query the user device CRM for its capabilities, such as whether the user device CRM is configured with a broadband transceiver, such as Wi-Fi or Li-Fi. If the CRM device is configured with a broadband transceiver and the user grants permission to use broadband, the lighting device LD 1024 establishes a broadband connection with the lighting device CRM. The video is delivered by the lighting device LD 1024 via the lighting device's 1024 broadband transceiver. This selection of transceivers may, for example, be based on user preferences associated with a video player application that requested the video data to be delivered to the user device CRM. In more detail, the user device CRM has user preference settings for a video player application in which the preferred delivery method is via broadband opposed to large-scale cellular communication network deliver, which may incur a charge to the user of the user device CRM. As a result of the user preference settings, the video data is delivered to the user device CRM via a broadband connection.

Lighting device LD 1024 may also respond to communications received from devices external to the private network 1005 such as server 1014. Lighting device's 1024 cellular transceiver may have an MDN associated with a public network (e.g., a large-scale cellular communication network), and is therefore capable of receiving information from the server 1014 as well as other devices, such as user device CRM. In the present example, the server 1014 may be a management server that is configured to provide information, such as control commands, software and firmware updates, and the like to lighting devices, such as lighting devices 1024 and 1020. As shown in the scenario 1000 of FIG. 10, the connection between the lighting device LD 1024 and the server 1014 is shown as an LTE data line over which lighting control information is being transmitted.

The LTE data line may be cellular radio frequency communication that is a high-power communication between the lighting device LD 1024 and server 1014. The lighting device LD 1024 is configured with the appropriate computer application that permits the server 1014 to provide lighting control commands and the like as discussed above. Upon receipt of the lighting control commands, the lighting device LD 1024 may determine which lighting devices in the private network 1005 are intended recipients of the received lighting control commands.

For example, the received lighting control command may be intended only for lighting device LD 1020, or may be intended for both lighting device LD 1024 and 1020, or some other group or groups of lighting devices that are in the space and available for inclusion in the private network 1005. If the lighting device LD 1024 processor determines that the received lighting commands are intended for lighting device LD 1020, the lighting device LD 1024 processor may determine which communication mode (such as private network cellular communication mode, broadband mode or Bluetooth) the lighting device LD 1024 may use. For example, if lighting device LD 1020 is within Bluetooth range of lighting device LD 1024, the lighting device LD 1024 processor may deliver the lighting control commands via the lighting device's 1024 Bluetooth transceiver. The determination of communication mode may be based on configuration and user preference settings made according to a lighting management application or managing device. In the illustrated example, the lighting device LD 1024 forwards the received lighting control commands via the private network (i.e., via the cellular transceiver using low-power cellular radio frequency signals) to the lighting device LD 1020, which also may be based on the configuration and/or user preference settings of the lighting device LD 1020.

Scenarios other than 900 and 1000 are also envisioned that permit user devices to participate in the private or cellular mesh networks. However, since lighting devices are ubiquitous, a lighting device configuration that includes the elements and features as described above improves upon existing lighting technology by providing a device that extends the communication reach of user devices in a space that has limited access to the large-scale cellular communication network while also facilitating the provision of value-added services to the space.

Figure 11:
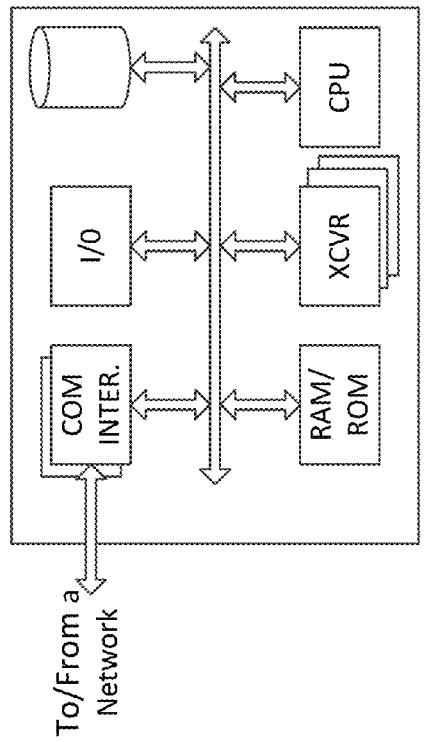
FIG. 11 is a simplified functional block diagram of a computer that may be configured as an appropriately-configured processor, for example, to function as the application processor of a lighting device as shown in the examples of FIGS. 4-6 or function as a server as shown in FIG. 8.
Figure 12:
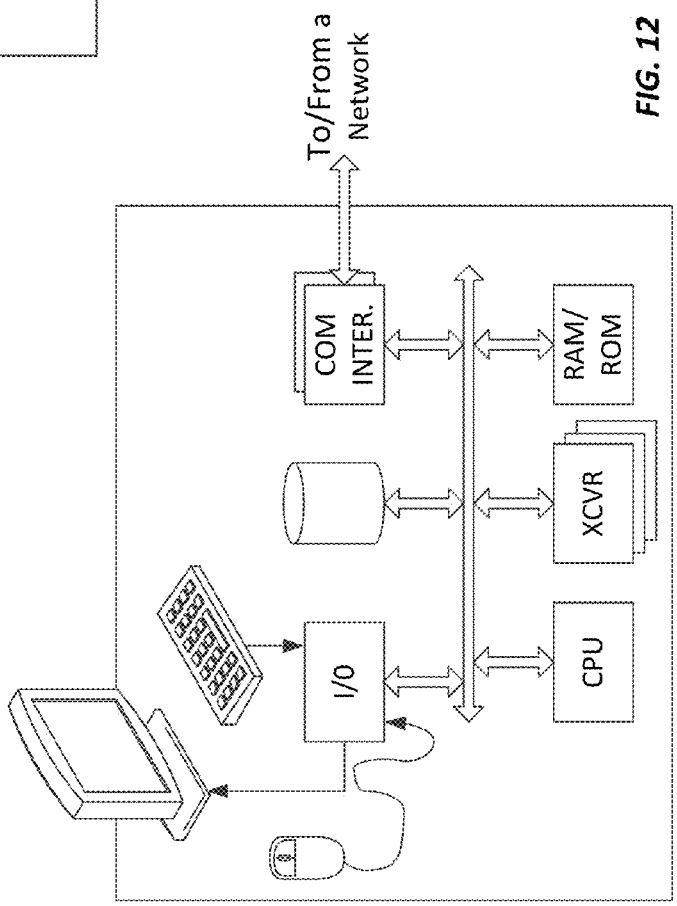
FIG. 12 is a simplified functional block diagram of a personal computer or other management device, which may be used as a management device or user device, in any of the examples of FIG. 1 or 8.

FIGS. 11 and 12 provide functional block diagram illustrations of examples of general purpose hardware platforms. FIG. 11 illustrates a network or host computer platform, as may typically be used to implement a host or server, such the computer 660 or if provided as a separate platform any of the lighting devices 300-500 of FIGS. 3-5 in which the respective lighting microcontroller, and/or lighting driver and light source may be considered part of the I/O components. FIG. 12 depicts a computer with user interface elements, as may be used to implement a personal computer or other type of work station or terminal device, such as one of the terminal 660 in FIG. 6, although the computer of FIG. 11 may also act as a server if appropriately programmed. The block diagram of a hardware platform of FIG. 11 represents an example of the lighting device, a user device, such as a tablet computer, smartphone or the like with an interface to one or more wireless links. It is believed that those skilled in the art are familiar with the structure, programming and general operation of such computer equipment and as a result the drawings should be self-explanatory.

A server (see e.g. FIGS. 6 and 10), for example, includes a data communication interface for packet data communication via the particular type of available network. The server also includes a central processing unit (CPU), in the form of one or more processor circuits, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Also, a computer configured as a server with respect to one layer or function may be configured as a client of a server in a different layer and/or for a different function. For example, the intelligent lighting devices 1024, 1020 operate as client devices of server functions implemented by 1014 or 1064, whereas the same platform performing the lighting control management function as a client or as a server with respect to the computer 660. Also, user terminal devices such as 660 often are configured as client devices; and the server 650 may function as a server with respect to client functionalities of devices such as 660.

Figure 13:
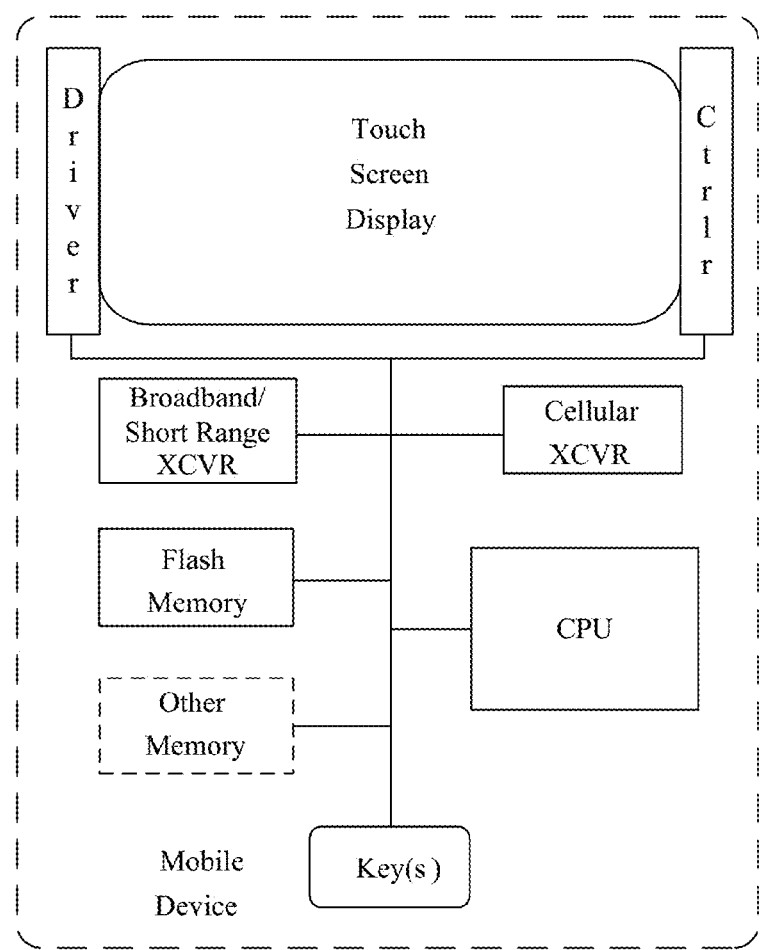
FIG. 13 is a simplified functional block diagram of a mobile device, as an alternate example of a user device, for possible communication in or with the system of FIG. 1.

A computer type user terminal device, such as a desktop or laptop type personal computer (PC), similarly includes a data communication interface, processing circuitry forming the CPU, main memory (such as a random access memory (RAM)) and one or more disc drives or other mass storage devices for storing user data and the various executable programs (see FIG. 12). A user device (see FIG. 10) type user terminal may include similar elements, but will typically use smaller components that also require less power, to facilitate implementation in a portable form factor. The example of FIG. 11 includes a wireless broadband network (Wi-Fi or Li-Fi) transceiver (XCVR), a cellular transceiver such as a 3G, 4G or LTE cellular network transceiver configurable for high-power communication typically associated with 3G, 4G or LTE cellular network communications as well as low-power communication over a shorter range, but that still utilized the 3G, 4G or LTE cellular network radio frequency spectrum. In addition to a cellular transceiver, the lighting device implementations of a computing device example of FIG. 11 also may include shorter range wireless transceiver such as a Bluetooth and/or Wi-Fi or Li-Fi transceivers for wireless communication within the spaces that a lighting device may be located. A mobile device (see FIG. 13) type user terminal may include similar elements, but will typically use smaller components that also require less power, to facilitate implementation in a portable form factor. The example of FIG. 13 includes a wireless cellular transceiver (XCVR) such as a 3G or 4G cellular network transceiver as well as a short range wireless transceiver such as a Bluetooth and/or WiFi transceiver for wireless broadband communication. The computer hardware platform of FIG. 11 the terminal computer platform of FIG. 12 and mobile user device of FIG. 13 are shown by way of example as using a RAM type main memory and a hard disk drive for mass storage of data and programming, whereas the lighting device of FIG. 11 and mobile user device of FIG. 13 may include a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 12). The user device example in FIG. 12 and the mobile user device example of FIG. 13 may provide a touchscreen type display, where the display is controlled by a display driver, and user touching of the screen is detected by a touch sense controller (not shown in FIG. 12, but indicated by Ctrlr in FIG. 13). The hardware elements, operating systems and programming languages of such computer and/or mobile user terminal devices also are conventional in nature, and it is presumed that those skilled in the art are adequately familiar therewith.

Although FIGS. 11 to 13 in their present form show computers and user terminal devices, generally similar configurations also may be used within other elements of the lighting device 300-500. For example, one implementation of the central processing unit (CPU), which may include a processor and/or an application processor, communication and interface elements of a lighting device may utilize an architecture similar to that of one of the computers or mobile user devices, such as smartphones, tablets or the like. As a more specific example, the personal computer type hardware in FIG. 12 (except for the keyboard, mouse and display) could serve as the processing element and communication elements of a lighting device, where the input/output interface I/O would interface to an appropriate light driver and to any sensor(s) or other enhancement input or output device(s) included within the lighting device. As another example of use of an architecture similar to those of FIGS. 11 and 12 that may be utilized in a device like that of FIGS. 3-5 or an environment of FIG. 6, a lighting controller or other user interface device (UI) might utilize an arrangement similar to the mobile device of FIG. 11, albeit possibly with only one transceiver compatible with the networking technology of the particular premises (e.g. to reduce costs).

The block diagram of a hardware platform of FIG. 13 represents an example of a mobile device, such as a tablet computer, smartphone or the like with a network interface to a wireless link, which may alternatively serve as a user device like 113a, A, or M. It is believed that those skilled in the art are familiar with the structure, programming and general operation of such computer equipment and as a result the drawings should be self-explanatory.

As also outlined above, aspects of a determining communications between lighting devices and user devices (e.g. FIGS. 7 and 8), and a process to determine a type of transceiver or transceiver setting to be utilized by a lighting device and/or a user device for communicating information (e.g., FIGS. 6 and 10) between the lighting device and the user device may be embodied in programming of the appropriate system elements. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or a management computer 660 of the lighting system service provider into the computer platform of any of the lighting devices 300-500, user devices or third party devices. Thus, another type of media that may bear the software/firmware program elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A lighting device, comprising:
   a light source configured to produce visible light for general illumination within a space in which the lighting device and a plurality of other lighting devices are located;
   at least one transceiver configured to:
      connect via wireless low power cellular signals with a small-scale cellular network without having to gain access to a large-scale cellular network, wherein the small-scale network includes similarly configured lighting devices of the plurality of other lighting devices and other devices within the space; and
      provide devices within the space with access to a broadband data network; and
   a processor coupled to the light source and the at least one transceiver, the processor configured to perform functions, including functions to:
      receive, via the at least one transceiver, a data network request requesting access to the broadband data network from a user device within the space, wherein the data network request is received via a short range, low power cellular signal; and
      in response to the data network request, establish a broadband connection for the requesting device via the at least one transceiver between the broadband data network and the user device.

2. The lighting device of claim 1, wherein:
   the at least one transceiver is a Wi-Fi transceiver, and
   prior to establishing the broadband connection, the processor is further configured to perform functions, including functions to:
      query the user device for user device capabilities; and
      receiving a response to the query indicating that the user device is configured with a Wi-Fi transceiver, and indicating user permission to establish the broadband connection.

3. The lighting device of claim 1, wherein:
   the at least one transceiver is a Li-Fi transceiver, and
   prior to establishing the broadband connection, the processor is further configured to perform functions, including functions to:
      query the user device for user device capabilities; and
      upon receiving a response to the query indicating that the user device is configured with a Li-Fi transceiver, and indicating user permission to establish the broadband connection.

4. The lighting device of claim 1, wherein the at least one transceiver comprises:
   a cellular transceiver configured to communicate via frequency spectrum of the small-scale cellular network and the large-scale cellular network; and
   a broadband transceiver configured to deliver data to user devices within the space via the broadband data network, wherein:
      the data network request is received by the cellular transceiver via the small-scale cellular network; and
      data from the broadband data network is delivered to the user device via the broadband transceiver.

5. The lighting device of claim 1, wherein prior to establishing the broadband connection, the processor is further configured to perform functions, including functions to:
   receive a user preference indication from the user device indicating a preference to receive data via the broadband connection.

6. The lighting device of claim 1, wherein the lighting device further comprises:
   a memory storing computer applications for execution by the processor, wherein the processor upon execution of at least one of the computer applications stored in the memory is further configured to perform functions, including functions to:
      receive a data request requesting data from an application executing on the user device;
      determine that a copy of the application executing on the user device is not resident in the memory;
      in response to the determination, send a request to an application server requesting a copy of the application executing on the user device; and
      upon receipt of the copy of the application, provide the requested data to the user device via the broadband connection.

7. The lighting device of claim 1, wherein:
the at least one transceiver is a cellular transceiver, the cellular transceiver having a lower power setting for communication in the small-scale cellular network, and a normal power setting for communication in the large-scale cellular network, and
the processor is further configured to:
set power settings of the cellular transceiver to communicate via the small-scale cellular network using low power signals to receive and respond to the data network request, and
set power settings of the cellular transceiver to communicate via the large-scale cellular network using low power signals to obtain data requested via the large-scale cellular network.

8. A method, comprising:
receiving by a processor of a lighting device a data request sent by a user device, wherein:
the user device and the lighting device being members of a small-scale cellular network that communicates via low power cellular signals, and
the lighting device being configured to produce visible light for general illumination within a space, and the lighting device comprising a broadband transceiver coupled to a communication interface;
querying the user device for user device capabilities via a query sent through the small scale cellular network;
receiving a query response indicating that the user device is configured with at least one transceiver and indicating user permission to establish a broadband connection; and
in response to receiving the indication of user permission, establishing the broadband connection via the communication interface between the broadband transceiver and the user device.

9. The method of claim 8, further comprising:
receiving by the lighting device processor an indication of user permission to establish the broadband connection.

10. The method of claim 8, further comprising:
receiving by the lighting device processor an indication that the user device is configured with a Li-Fi transceiver.

11. The method of claim 8, further comprising:
receiving by the lighting device processor an indication that the user device is configured with a Wi-Fi transceiver.

12. The method of claim 8, further comprising:
receiving by the lighting device processor a user preference indication from the user device indicating a preference to receive data via the broadband connection.

13. The method of claim 8, further comprising:
prior to establishing the broadband connection,
receiving a user preference indication from the user device indicating a preference to receive data via the broadband connection.

14. The method of claim 8, further comprising:
receiving via the communication interface a data request requesting data from an application executing on the user device;
determining that a copy of the application executing on the user device is not resident in the memory;
in response to the determination, sending a request to an application server requesting a copy of the application executing on the user device; and
upon receipt of the copy of the application, providing the requested data to the user device via the broadband connection.

15. A system, comprising:
a user device including:
a cellular transceiver configured to communicate via a frequency spectrum of a small-scale cellular network;
a user device broadband transceiver configured to deliver data to devices; and
a user device processor coupled to the cellular transceiver and the broadband transceiver, the processor configured to:
transmit within the small-scale cellular network a message requesting access to a broadband network; and
upon connection to the broadband network, receive data in response to a data request; and
a plurality of lighting devices within a space in which the plurality of lighting devices and the user device are located, wherein one or more of the lighting devices includes:
a light source configured to produce visible light for providing general illumination within the space;
at least one lighting device transceiver configured to:
connect via wireless low power cellular signals with a small-scale cellular network without having to gain access to a large-scale cellular network, wherein the small-scale cellular network includes similarly configured lighting devices of the plurality of other lighting devices and other devices within the space; and
provide devices within the space with access to a broadband data network;
a communication interface configured to distribute signals to the at least one transceiver; and
a lighting device processor coupled to the communication interface and the at least one transceiver, the processor configured to perform functions, including functions to:
receive a data network request from the user device, the data network request requesting access to a broadband data network, wherein the data network request is received via a short range, low power cellular signal; and
in response to the data network request requesting access to the broadband data network, establish a broadband connection via the communication interface between the broadband data network and the user device.

16. The system of claim 15, wherein:
the user device broadband transceiver and the at least one transceiver are Li-Fi transceivers, and
prior to establishing the broadband connection, the lighting device processor is further configured to perform functions, including functions to:
query the user device for user device capabilities; and
upon receiving a response to the query indicating that the user device is configured with the user device Li-Fi transceiver, receiving from the user device an indication of user permission to establish the broadband connection.

17. The system of claim 15, wherein prior to establishing the broadband connection, the lighting device processor is further configured to perform functions, including functions to:
receive a user preference indication from the user device indicating a preference to receive data via the broadband connection.

18. The system of claim 15, wherein the lighting device further comprises:
a memory storing computer applications for execution by the lighting device processor, wherein the lighting device processor upon execution of at least one of the computer applications stored in the memory is further configured to perform functions, including functions to:
receive via the communication interface a data request requesting data from an application executing on the user device;
determine that a copy of the application executing on the user device is not resident in the memory;
in response to the determination, send a request to an application server requesting a copy of the application executing on the user device; and
upon receipt of the copy of the application, provide the requested data to the user device via the broadband connection.

19. The system of claim 15, wherein the lighting device further comprises:
the at least one transceiver is a Wi-Fi transceiver, and
prior to establishing the broadband connection, the processor is further configured to perform functions, including functions to:
query the user device for user device capabilities; and
upon receiving a response to the query indicating that the user device is configured with a Wi-Fi transceiver, receiving an indication of user permission to establish the broadband connection.

20. The system of claim 15, wherein the lighting device further comprises:
the at least one transceiver is a Li-Fi transceiver, and
prior to establishing the broadband connection, the processor is further configured to perform functions, including functions to:
query the user device for user device capabilities; and
upon receiving a response to the query indicating that the user device is configured with a Li-Fi transceiver, receiving an indication of user permission to establish the broadband connection.

21. The system of claim 15, wherein the at least one lighting device transceiver comprises:
a cellular transceiver configured to communicate via frequency spectrum of the small-scale cellular network and the large-scale cellular network; and
a broadband transceiver configured to deliver data to user devices within the space via the broadband data network, wherein:
the data network request is received by the cellular transceiver via the small-scale cellular network; and
data from the broadband data network is delivered to the user device via the broadband transceiver.

22. The system of claim 15, wherein:
the at least one transceiver is a cellular transceiver, the cellular transceiver having a lower power setting for communication in the small-scale cellular network, and a normal power setting for communication in the large-scale cellular network, and
the processor is further configured to:
set power settings of the cellular transceiver to communicate via the small-scale cellular network using low power signals to receive and respond to the data network request, and
set power settings of the cellular transceiver to communicate via the large-scale cellular network using low power signals to obtain data requested via the large-scale cellular network.

* * * * *